United States Patent
Zhao et al.

(10) Patent No.: US 11,206,417 B2
(45) Date of Patent: Dec. 21, 2021

(54) METHOD AND APPARATUS FOR VIDEO CODING

(71) Applicant: TENCENT AMERICA LLC, Palo Alto, CA (US)

(72) Inventors: Xin Zhao, Santa Clara, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/887,489

(22) Filed: May 29, 2020

(65) Prior Publication Data
US 2020/0382805 A1 Dec. 3, 2020

Related U.S. Application Data

(60) Provisional application No. 62/854,944, filed on May 30, 2019.

(51) Int. Cl.
*H04N 11/02* (2006.01)
*H04N 19/46* (2014.01)
*H04N 19/176* (2014.01)
*H04N 19/146* (2014.01)
*H04N 19/119* (2014.01)

(52) U.S. Cl.
CPC .......... *H04N 19/46* (2014.11); *H04N 19/119* (2014.11); *H04N 19/146* (2014.11); *H04N 19/176* (2014.11)

(58) Field of Classification Search
CPC ..................................... H04N 19/46
USPC ........................ 375/240.01–240.29
See application file for complete search history.

(56) References Cited

U.S. PATENT DOCUMENTS

| 5,867,602 A * | 2/1999 | Zandi | G06F 17/148 375/E7.016 |
| 9,536,323 B2 * | 1/2017 | Okamoto | G06T 9/00 |
| 10,404,988 B2 * | 9/2019 | Ye | H04N 19/96 |
| 2008/0232465 A1 * | 9/2008 | Zhang | H04N 19/18 375/240.03 |
| 2011/0164684 A1 * | 7/2011 | Sato | H04N 19/105 375/240.16 |
| 2017/0264913 A1 * | 9/2017 | Kazui | H04N 19/187 |
| 2018/0109812 A1 * | 4/2018 | Tsai | H04N 19/647 |
| 2019/0335172 A1 * | 10/2019 | Zhao | H04N 19/176 |

* cited by examiner

*Primary Examiner* — Leron Beck
(74) *Attorney, Agent, or Firm* — Oblon, McClelland, Maier & Neustadt, L.L.P.

(57) ABSTRACT

Aspects of the disclosure provide methods and apparatuses for video encoding/decoding. In some examples, an apparatus for video decoding includes receiving circuitry and processing circuitry. For example, the processing circuitry decodes, from a coded video bitstream, a flag that is indicative of whether applying a lossless coding mode. In response the flag being indicative of applying the lossless coding mode, the processing circuitry partitions a block into multiple blocks based on the block having at least one side that is equal to or greater than a threshold size for zeroing out a portion of the block. Thus, video quality loss due to zero out can be avoided. Then, the processing circuitry reconstructs the multiple blocks respectively from the coded video bitstream based on the lossless coding mode.

20 Claims, 26 Drawing Sheets

```
pic_parameter_set_rbsp( ) {
        pps_pic_parameter_set_id
        pps_seq_parameter_set_id
        dependent_slice_segments_enabled_flag
        sign_data_hiding_flag
        cabac_init_present_flag
        num_ref_idx_l0_default_active_minus1
        num_ref_idx_l1_default_active_minus1
        init_qp_minus26
        constrained_intra_pred_flag
        transform_skip_enabled_flag
        cu_qp_delta_enabled_flag
        if ( cu_qp_delta_enabled_flag )
                diff_cu_qp_delta_depth
        pps_cb_qp_offset
        pps_cr_qp_offset
        pps_slice_chroma_qp_offsets_present_flag
        weighted_pred_flag
        weighted_bipred_flag
        output_flag_present_flag
        transquant_bypass_enable_flag
        tiles_enabled_flag
        entropy_coding_sync_enabled_flag
        if( tiles_enabled_flag ) {
                num_tile_columns_minus1
                num_tile_rows_minus1
                uniform_spacing_flag
                if( !uniform_spacing_flag ) {
                        for( i = 0; i < num_tile_columns_minus1; i++ )
                                column_width_minus1[ i ]
                        for( i = 0; i < num_tile_rows_minus1; i++ )
                                row_height_minus1[ i ]
                }
                loop_filter_across_tiles_enabled_flag
        }
```

FIG. 9A

CONTINUE FROM FIG. 9A

*900*

```
        loop_filter_across_slices_enabled_flag
        deblocking_filter_control_present_flag
        if( deblocking_filter_control_present_flag ) {
                deblocking_filter_override_enabled_flag
                pps_disable_deblocking_filter_flag
                if( !pps_disable_deblocking_filter_flag ) {
                        pps_beta_offset_div2
                        pps_tc_offset_div2
                }
        }
        pps_scaling_list_data_present_flag
        if( pps_scaling_list_data_present_flag )
                scaling_list_data( )
        lists_modification_present_flag
        log2_parallel_merge_level_minus2
        num_extra_slice_header_bits
        slice_segment_header_extension_present_flag
        pps_extension_flag
        if( pps_extension_flag )
                while( more_rbsp_data( ) )
                        pps_extension_data_flag
        rbsp_trailing_bits( )
}
```

*FIG. 9B*

Inputs to this process are:

- a location ( xCurr, yCurr ) specifying the top-left sample of the current block relative to the top-left sample of the current picture component,
- the variables nCurrSw and nCurrSh specifying the width and height, respectively, of the current block,
- a variable cIdx specifying the colour component of the current block,
- an (nCurrSw) x (nCurrSh) array predSamples specifying the predicted samples of the current block,
- an (nCurrSw) x (nCurrSh) array resSamples specifying the residual samples of the current block.

Output of this process is a reconstructed picture sample array recSamples.

Depending on the value of the colour component cIdx, the following assignments are made:

- If cIdx is equal to 0, recSamples corresponds to the reconstructed picture sample array $S_L$ and the function clipCidx1 corresponds to Clip1$_Y$.
- Otherwise, if cIdx is equal to 1, recSamples corresponds to the reconstructed chroma sample array $S_{Cb}$ and the function clipCidx1 corresponds to Clip1$_C$.
- Otherwise (cIdx is equal to 2), recSamples corresponds to the reconstructed chroma sample array $S_{Cr}$ and the function clipCidx1 corresponds to Clip1$_C$.

Depending on the value of slice_lmcs_enabled_flag, the following applies:

- If slice_lmcs_enabled_flag is equal to 0 or cu_lossless_mode_flag is equal to 1, the (nCurrSw)x(nCurrSh) block of the reconstructed samples recSamples at location ( xCurr, yCurr ) is derived as follows for i = 0..nCurrSw − 1, j = 0..nCurrSh − 1:

recSamples[ xCurr + i ][ yCurr + j ] = clipCidx1( predSamples[ i ][ j ] + resSamples[ i ][ j ] )

- Otherwise (slice_lmcs_enabled_flag is equal to 1), the following applies:

- If cIdx is equal to 0, the following applies:

- The picture reconstruction with mapping process for luma samples is invoked with the luma location ( xCurr, yCurr ), the block width nCurrSw and height nCurrSh, the predicted luma sample array predSamples, and the residual luma sample array resSamples as inputs, and the output is the reconstructed luma sample array recSamples.

- The picture reconstruction with inverse mapping process for luma samples is invoked with the reconstructed luma sample array recSamples as inputs, and the output is the modified reconstructed luma sample array recSamples.

- Otherwise (cIdx is greater than 0), the picture reconstruction with luma dependent chroma residual scaling process for chroma samples is invoked with the chroma location ( xCurr, yCurr ), the transform block width nCurrSw and height nCurrSh, the predicted chroma sample array predSamples, and the residual chroma sample array resSamples as inputs, and the output is the reconstructed chroma sample array recSamples.

FIG. 15

Weighted sample prediction process for combined merge and intra prediction

Inputs to this process are:

- the width of the current coding block cbWidth,
- the height of the current coding block cbHeight,
- two (cbWidth)x(cbHeight) arrays predSamplesInter and predSamplesIntra,
- the intra prediction mode predModeIntra,
- a variable cIdx specifying the colour component index.

Output of this process is the (cbWidth)x(cbHeight) array predSamplesComb of prediction sample values.

The variable bitDepth is derived as follows:

- If cIdx is equal to 0, bitDepth is set equal to BitDepth$_Y$.
- Otherwise, bitDepth is set equal to BitDepth$_C$.

The prediction samples predSamplesComb[ x ][ y ] with x = 0..cbWidth − 1 and y = 0..cbHeight − 1 are derived as follows:

- The weight w is derived as follows:
    - If one or more of the following conditions are true, w is set equal to 4:
        - cbWidth is less than 4.
        - cbHeight is less than 4.
        - predModeIntra is equal to INTRA_PLANAR
        - predModeIntra is equal to INTRA_DC.
    - Otherwise, if predModeIntra is INTRA_ANGULAR50, w is specified in Table 8-11 with nPos equal to y and nSize equal to cbHeight.
    - Otherwise, if predModeIntra is INTRA_ANGULAR18, w is specified in Table 8-11 with nPos equal to x and nSize equal to cbWidth.
    - Otherwise, w is set equal to 4.
- When cIdx is equal to 0 and slice_lmcs_enabled_flag is equal to 1 and cu_lossless_mode_flag is equal to 0, predSamplesInter is modified as follows:

idxY = predSamplesInter[ x ][ y ] >> Log2( OrgCW )
    predSamplesInter[ x ][ y ] = Clip1$_Y$ ( LmcsPivot[ idxY ] +
                ( ScaleCoeff[ idxY ] * ( predSamplesInter[ x ][ y ] − InputPivot[ idxY ] ) +
                ( 1 << 13 ) ) >> 14 )

- The prediction samples predSamplesComb[ x ][ y ] are derived as follows:

predSamplesComb[ x ][ y ] = ( w * predSamplesIntra[ x ][ y ] +
                    ( 8 − w ) * predSamplesInter[ x ][ y ] ) >> 3 )

Table 8-11 – Specification of w as a function of the position nP and the size nS

| 0 <= nP < ( nS / 4 ) | ( nS / 4 ) <= nP < ( nS / 2 ) | ( nS / 2 ) <= nP < ( 3 *nS / 4 ) | ( 3 *nS / 4 ) <= nP < nS |
|---|---|---|---|
| 6 | 5 | 3 | 2 |

FIG. 16

```
coding_unit( x0, y0, cbWidth, cbHeight, treeType ) {
    if( lossless_mode_enable_flag ) {
        cu_lossless_mode_flag
    }
    if( tile_group_type != I || sps_ibc_enabled_flag ) {
        if( treeType != DUAL_TREE_CHROMA )
            cu_skip_flag[ x0 ][ y0 ]
        if( cu_skip_flag[ x0 ][ y0 ] = = 0 && tile_group_type != I )
            pred_mode_flag
        if( ( ( tile_group_type = = I && cu_skip_flag[ x0 ][ y0 ] = =0 ) ||
            ( tile_group_type != I && CuPredMode[ x0 ][ y0 ] !=
MODE_INTRA ) ) &&
            sps_ibc_enabled_flag )
            pred_mode_ibc_flag
    }
    if( CuPredMode[ x0 ][ y0 ] = = MODE_INTRA ) {
        if( pred_mode_flag = = MODE_INTRA && ( cIdx = = 0 ) &&
            ( cbWidth <= 32 ) && ( CbHeight <= 32 ) &&
            !cu_lossless_mode_flag ) {
                bdpcm_flag[ x0 ][ y0 ]
                if( bdpcm_flag[ x0 ][ y0 ] ) {
                    bdpcm_dir_flag[ x0 ][ y0 ]
                }
                else {
......
    } else if( treeType != DUAL_TREE_CHROMA ) { /* MODE_INTER or
MODE_IBC */
......
    }
......
}
```

FIG. 17

```
coding_unit( x0, y0, cbWidth, cbHeight, treeType ) {
    if( slice_type != I || sps_ibc_enabled_flag ) {
        if( treeType != DUAL_TREE_CHROMA )
            cu_skip_flag[ x0 ][ y0 ]
        if( cu_skip_flag[ x0 ][ y0 ] = = 0 && slice_type != I )
            pred_mode_flag
        if( ( ( slice_type = = I && cu_skip_flag[ x0 ][ y0 ] = =0 ) ||
            ( slice_type != I && CuPredMode[ x0 ][ y0 ] != MODE_INTRA ) )
&&
            sps_ibc_enabled_flag )
            pred_mode_ibc_flag
    }
    if( CuPredMode[ x0 ][ y0 ] = = MODE_INTRA ) {
......
    } else if( treeType != DUAL_TREE_CHROMA ) { /* MODE_INTER or
MODE_IBC */
......
    }
    if( !pcm_flag[ x0 ][ y0 ] ) {
        if( CuPredMode[ x0 ][ y0 ] != MODE_INTRA && merge_flag[ x0 ][ y0
] = = 0 )
            cu_cbf
        if( cu_cbf ) {
            if( CuPredMode[ x0 ][ y0 ] = = MODE_INTER &&       1810
sps_sbt_enabled_flag &&
                        !ciip_flag[ x0 ][ y0 ] && !cu_lossless_mode_flag ) {
                if( cbWidth <= MaxSbtSize && cbHeight <= MaxSbtSize )
{
```

FIG. 18A

CONTINUE FROM FIG. 18A  1800

```
                    allowSbtVerH = cbWidth >= 8
                    allowSbtVerQ = cbWidth >= 16
                    allowSbtHorH = cbHeight >= 8
                    allowSbtHorQ = cbHeight >= 16
                    if( allowSbtVerH || allowSbtHorH ||
allowSbtVerQ || allowSbtHorQ )
                        cu_sbt_flag
                }
                if( cu_sbt_flag ) {
                    if( ( allowSbtVerH || allowSbtHorH ) && (
allowSbtVerQ || allowSbtHorQ) )
                        cu_sbt_quad_flag
                    if( ( cu_sbt_quad_flag && allowSbtVerQ &&
allowSbtHorQ ) ||
                        ( !cu_sbt_quad_flag && allowSbtVerH
&& allowSbtHorH ) )
                        cu_sbt_horizontal_flag
                    cu_sbt_pos_flag
                }
            }
            numZeroOutSigCoeff = 0
            transform_tree( x0, y0, cbWidth, cbHeight, treeType )
            if( Min( cbWidth, cbHeight ) >= 4 && sps_st_enabled_flag ==
1 && CuPredMode[ x0 ][ y0 ] == MODE_INTRA
&& IntraSubPartitionsSplitType == ISP_NO_SPLIT && !cu_lossless_mode_flag)
{
                if( ( numSigCoeff > ( ( treeType == SINGLE_TREE ) ? 2
: 1 ) ) &&
numZeroOutSigCoeff == 0 ) {
                    st_idx[ x0 ][ y0 ]
                }
            }
        }
    }
}
```
1820

FIG. 18B

```
transform_unit( x0, y0, tbWidth, tbHeight, treeType, subTuIndex ) {
    if( treeType = = SINGLE_TREE || treeType = = DUAL_TREE_LUMA ) {
        if( ( IntraSubPartitionsSplitType = = ISP_NO_SPLIT && !(
cu_sbt_flag &&
                ( ( subTuIndex = = 0 && cu_sbt_pos_flag ) ||
                    ( subTuIndex = = 1 && !cu_sbt_pos_flag ) ) ) ) ||
                ( IntraSubPartitionsSplitType != ISP_NO_SPLIT &&
                ( subTuIndex < NumIntraSubPartitions − 1 || !InferTuCbfLuma )
) )
            tu_cbf_luma[ x0 ][ y0 ]
        if (IntraSubPartitionsSplitType != ISP_NO_SPLIT )
            InferTuCbfLuma = InferTuCbfLuma && !tu_cbf_luma[ x0 ][ y0
]
    }
    if( ( treeType = = SINGLE_TREE || treeType = = DUAL_TREE_CHROMA )
{
        if( ( IntraSubPartitionsSplitType = = ISP_NO_SPLIT && !(
cu_sbt_flag &&
                ( ( subTuIndex = = 0 && cu_sbt_pos_flag ) ||
                    ( subTuIndex = = 1 && !cu_sbt_pos_flag ) ) ) ) ||
                ( IntraSubPartitionsSplitType != ISP_NO_SPLIT &&
                ( subTuIndex = = NumIntraSubPartitions − 1 ) ) ) {
            tu_cbf_cb[ x0 ][ y0 ]
            tu_cbf_cr[ x0 ][ y0 ]
        }
    }
    if( IntraSubPartitionsSplitType != ISP_NO_SPLIT &&
        treeType = = SINGLE_TREE && subTuIndex = =
NumIntraSubPartitions − 1 ) )
        xC = CbPosX[ x0 ][ y0 ]
        yC = CbPosY[ x0 ][ y0 ]
        wC = CbWidth[ x0 ][ y0 ] / 2
        hC = CbHeight[ x0 ][ y0 ] / 2
    } else
```

FIG. 19A

*CONTINUE FROM FIG. 19A*                                      1900

```
            xC = x0
            yC = y0
            wC = tbWidth / SubWidthC
            hC = tbHeight / SubHeightC
      }
      if( ( tu_cbf_luma[ x0 ][ y0 ] || tu_cbf_cb[ x0 ][ y0 ] || tu_cbf_cr[ x0 ][ y0 ] ) &&
            treeType != DUAL_TREE_CHROMA ) {
            if( cu_qp_delta_enabled_flag && !IsCuQpDeltaCoded ) {
                  cu_qp_delta_abs
                  if( cu_qp_delta_abs )
                        cu_qp_delta_sign_flag
            }
      }
      if( tu_cbf_luma[ x0 ][ y0 ] && treeType != DUAL_TREE_CHROMA
            && ( tbWidth <= 32 ) && ( tbHeight <= 32 )                      1910
            && ( IntraSubPartitionsSplit[ x0 ][ y0 ] == ISP_NO_SPLIT ) && (
           !cu_sbt_flag ) && (!cu_lossless_mode_flag) ) {
            if( transform_skip_enabled_flag && tbWidth <= MaxTsSize && tbHeight
<= MaxTsSize )
                  transform_skip_flag[ x0 ][ y0 ]
            if( ((( CuPredMode[ x0 ][ y0 ] != MODE_INTRA &&
sps_explicit_mts_inter_enabled_flag )
                  || ( CuPredMode[ x0 ][ y0 ] == MODE_INTRA &&
sps_explicit_mts_intra_enabled_flag ))
                  && ( tbWidth <= 32 ) && ( tbHeight <= 32 ) && (
!transform_skip_flag[ x0 ][ y0 ] ) )
                  tu_mts_idx[ x0 ][ y0 ]
      }
      if( tu_cbf_luma[ x0 ][ y0 ] )
            residual_coding( x0, y0, Log2( tbWidth ), Log2( tbHeight ), 0 )
      if( tu_cbf_cb[ x0 ][ y0 ] )
            residual_coding( xC, yC, Log2( wC ), Log2( hC ), 1 )
      if( tu_cbf_cr[ x0 ][ y0 ] )
            residual_coding( xC, yC, Log2( wC ), Log2( hC ), 2 )
}
```

FIG. 19B

METHOD AND APPARATUS FOR VIDEO CODING

INCORPORATION BY REFERENCE

This present disclosure claims the benefit of priority to U.S. Provisional Application No. 62/854,944, "FURTHER MODIFICATIONS OF LOSSLESS CODING MODE IN VVC" filed on May 30, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

SUMMARY

Aspects of the disclosure provide methods and apparatuses for video encoding/decoding. In some examples, an apparatus for video decoding includes receiving circuitry and processing circuitry. For example, the processing circuitry decodes, from a coded video bitstream, a flag that is indicative of whether applying a lossless coding mode. In response the flag being indicative of applying the lossless coding mode, the processing circuitry partitions a block into multiple blocks based on the block having at least one side that is equal to or greater than a threshold size for zeroing out a portion of the block. Thus, video quality loss due to zero out can be avoided. Then, the processing circuitry reconstructs the multiple blocks respectively from the coded video bitstream based on the lossless coding mode.

In some embodiments, the flag is signaled in at least one of a video parameter set (VPS), a sequence parameter set (SPS), a picture parameter set (PPS), a slice header, a tile header, and a tile group header. In an embodiment, the processing circuitry splits the block into a left block and a right block of equal sizes based on a width of the block being equal to or greater than the threshold size and a height of the block being less than the threshold size. In another embodiment, the processing circuitry splits the block into a top block and a bottom block of equal sizes based on the width of the block being less than the threshold size and the height of the block being equal to or greater than the threshold size. In another embodiment, the processing circuitry splits the block into a top left block, a top right block, a bottom left block and a bottom right block of equal sizes based on both of the width and the height of the block being equal to or greater than the threshold size.

In some examples, the block is a coding block or coding unit. In some other examples, the block is a transform block or transform unit.

In some embodiments, the processing circuitry disables the lossless coding mode to be applied on the block based on a mixture of the lossless coding mode and lossy coding modes being allowed in the coded video bitstream, and reconstructs the block from the coded video bitstream based on a lossy coding mode.

In some embodiments, the processing circuitry sets a maximum coding tree unit (CTU) size to be less than the threshold size to avoid the zero-out operation in coding tree units.

In an embodiment, the flag is a first flag associated with the block and indicative of the lossless coding mode associated with the block, the first flag is different from a second flag for indicating a bypass of transform and quantization operations on the block.

In another embodiment, the flag is associated with the block and is indicative of the lossless coding mode that includes a bypass of transform and quantization operations on the block.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIGS. 9A and 9B show a syntax table in picture parameter set.

FIG. 15 shows an example of a modified video coding standard according to some embodiments.

FIG. 16 shows another example of a modified video coding standard according to some embodiments.

FIG. 17 shows a table of coding unit syntax for coding a coding unit in some examples.

FIGS. 18A-18B show a table of coding unit syntax for coding a coding unit in some embodiments.

FIGS. 19A-19B show a table of transform unit syntax in some examples.

DETAILED DESCRIPTION OF EMBODIMENTS

Figure 1:
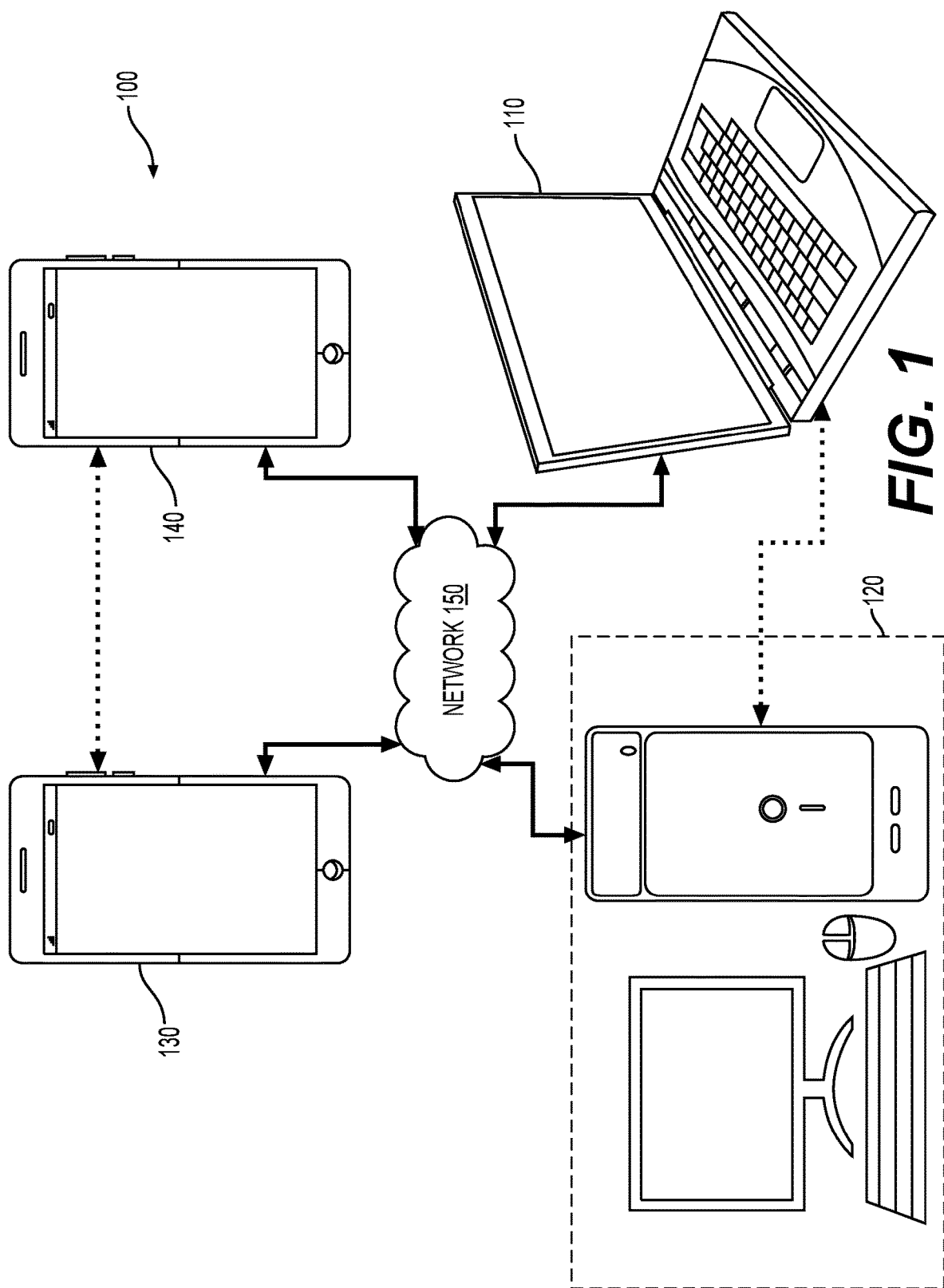
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
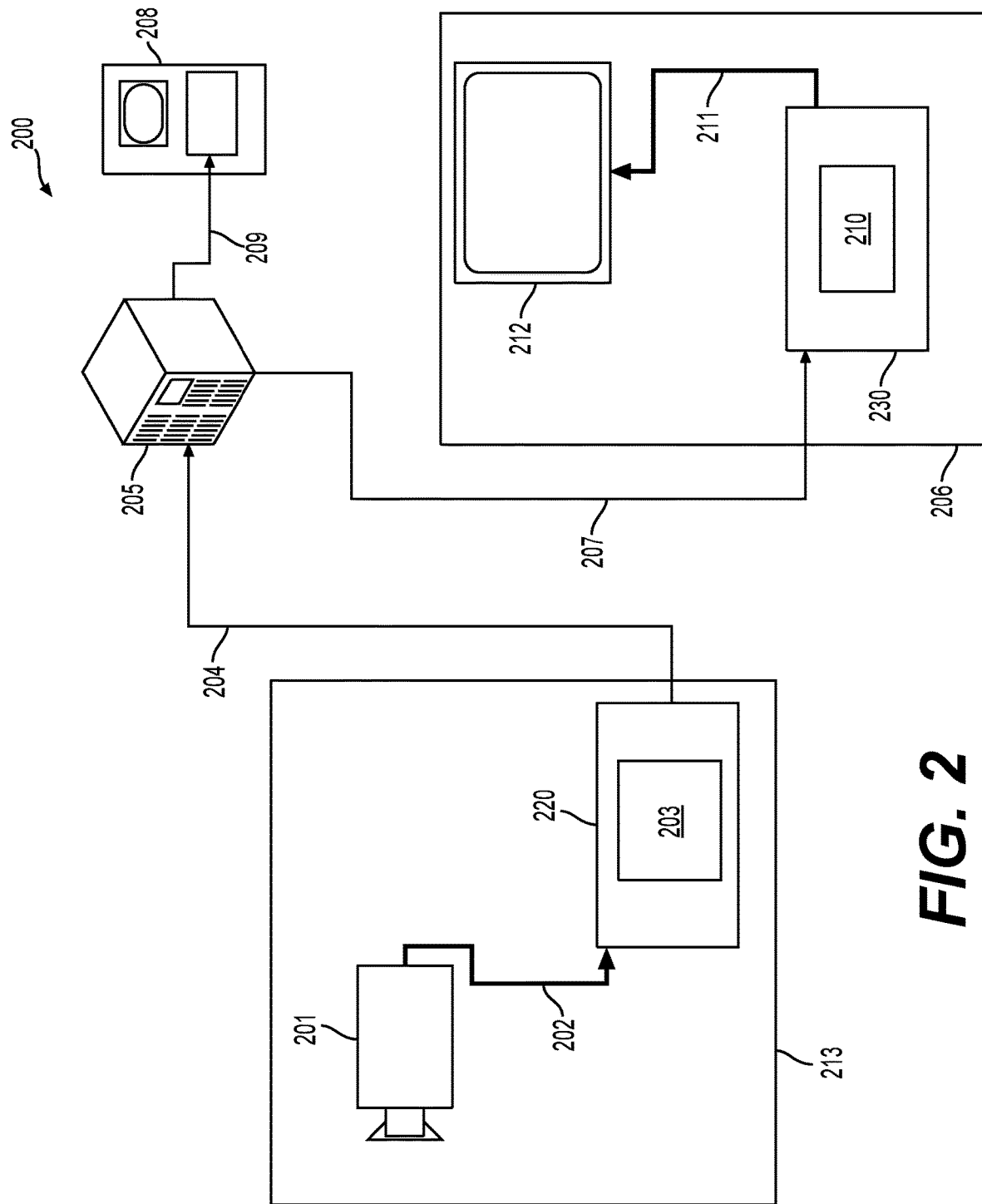
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
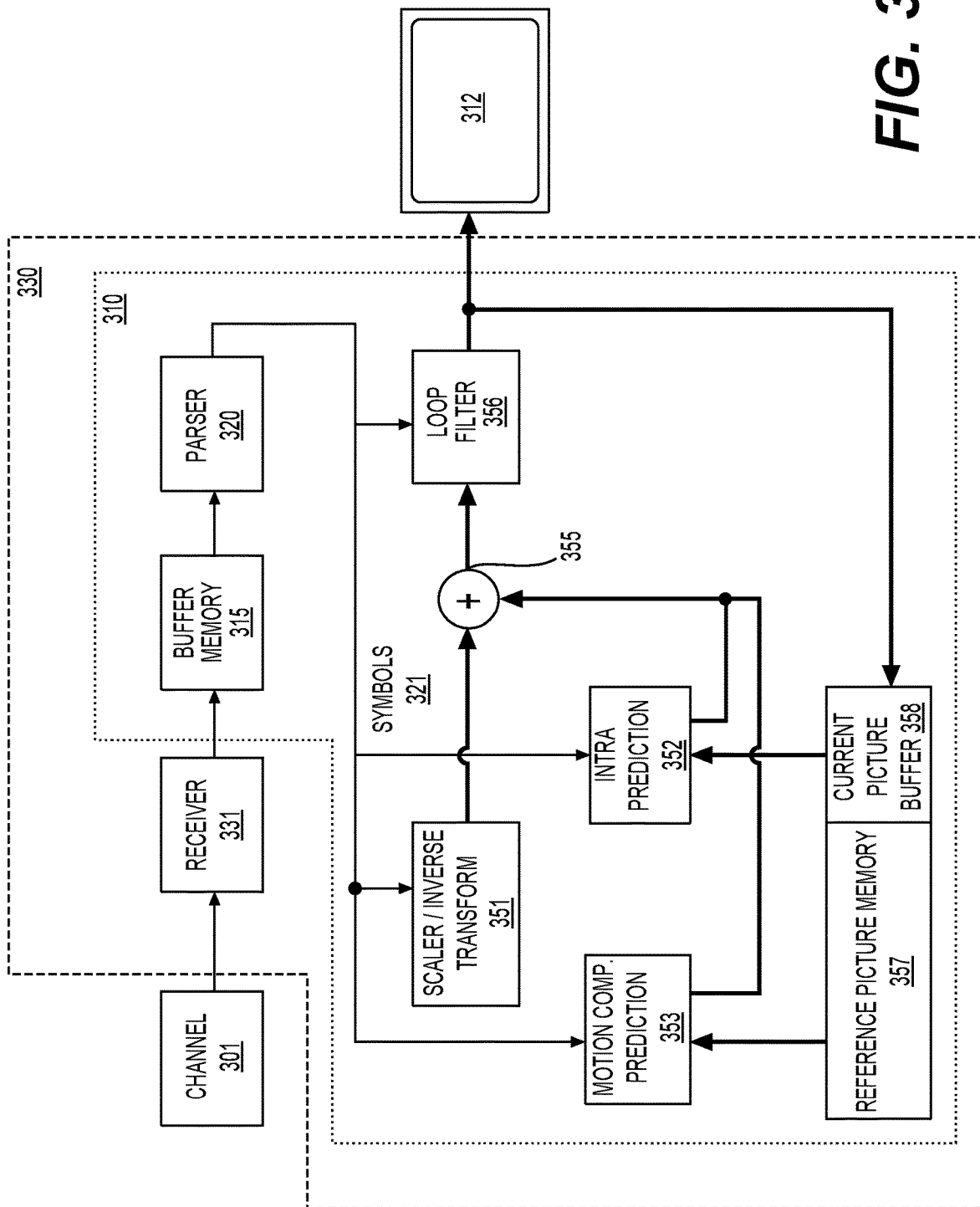
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
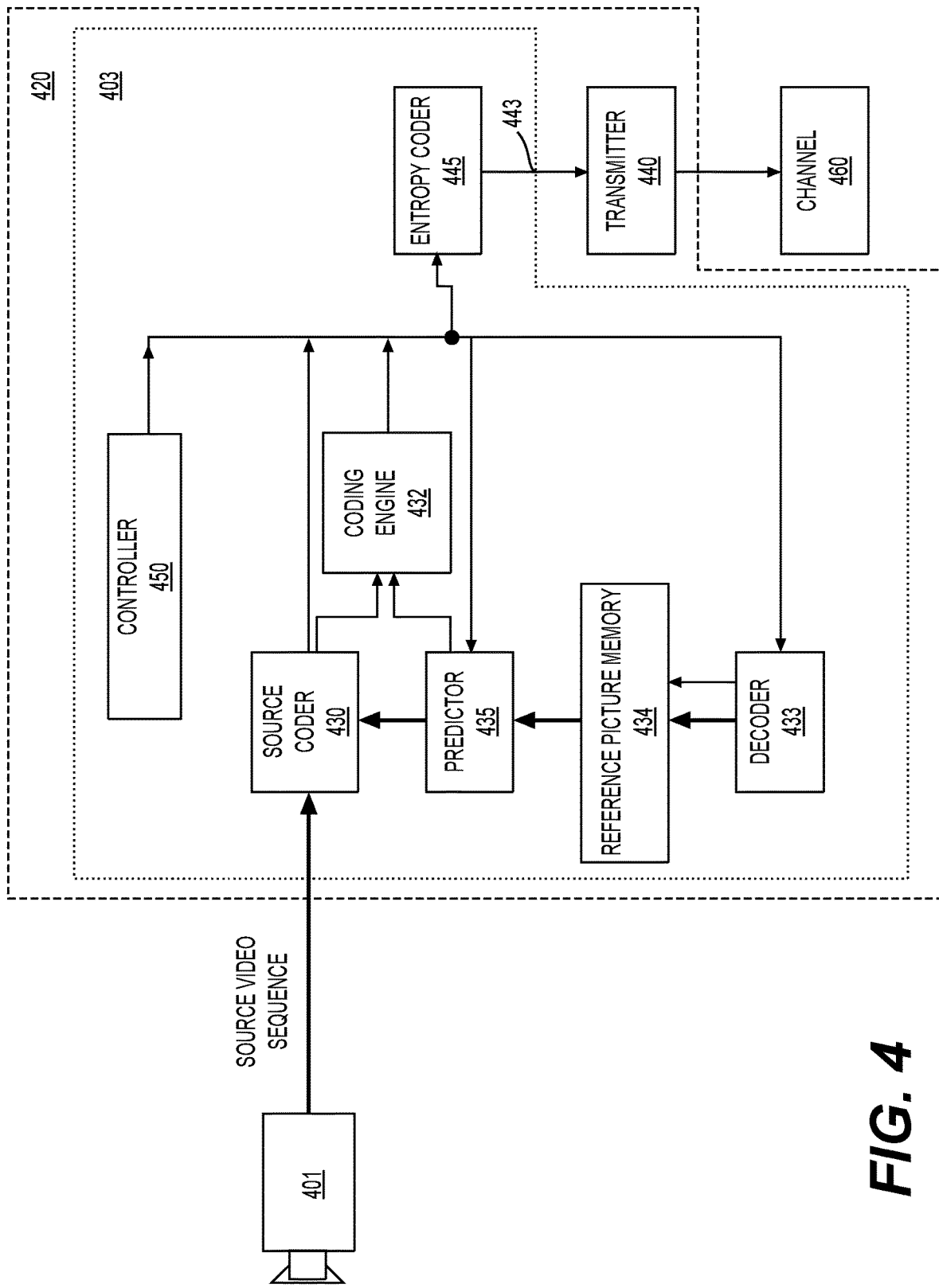
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously coded picture from the video sequence that were designated as "reference pictures." In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by losslessly compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
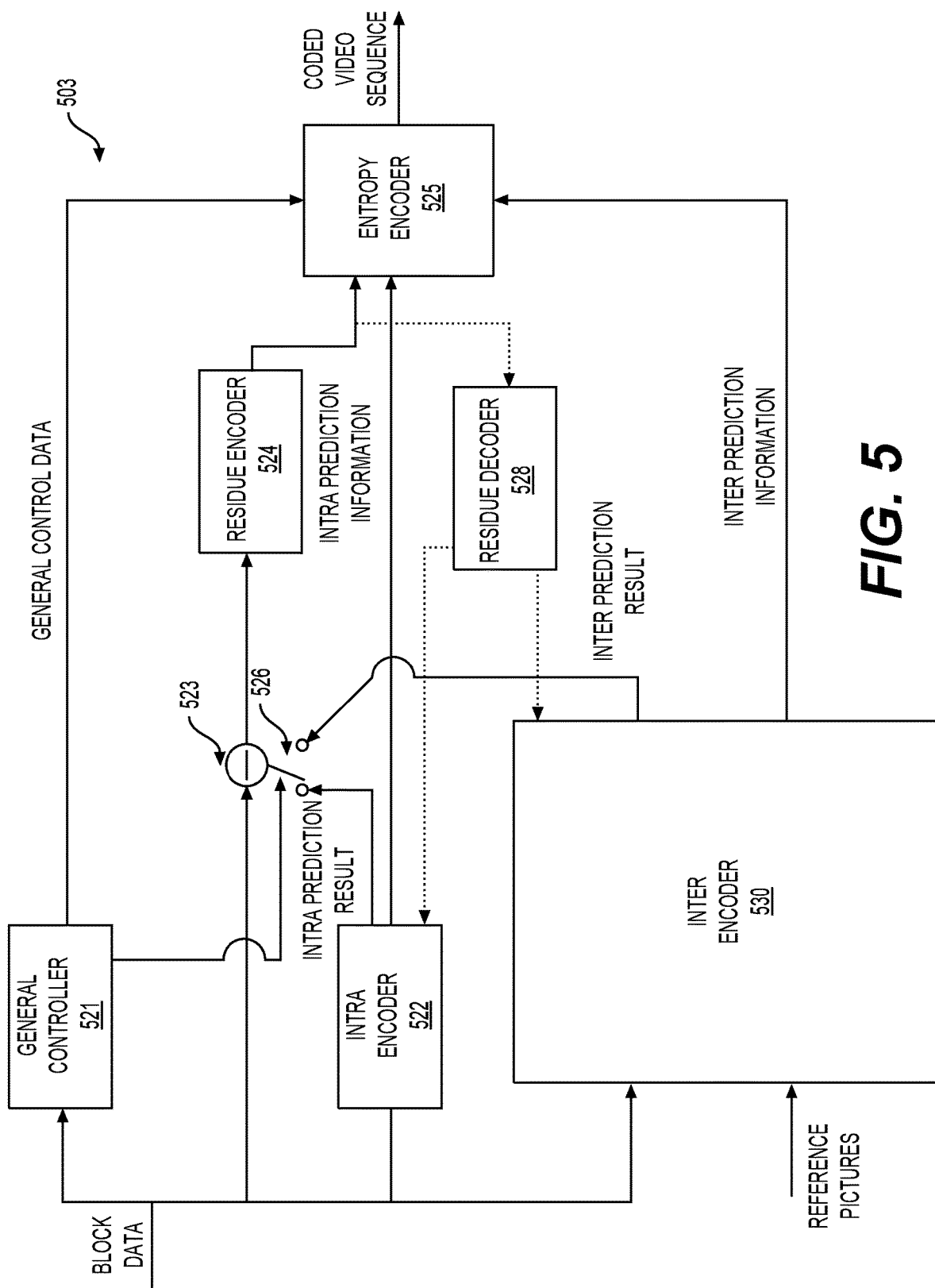
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
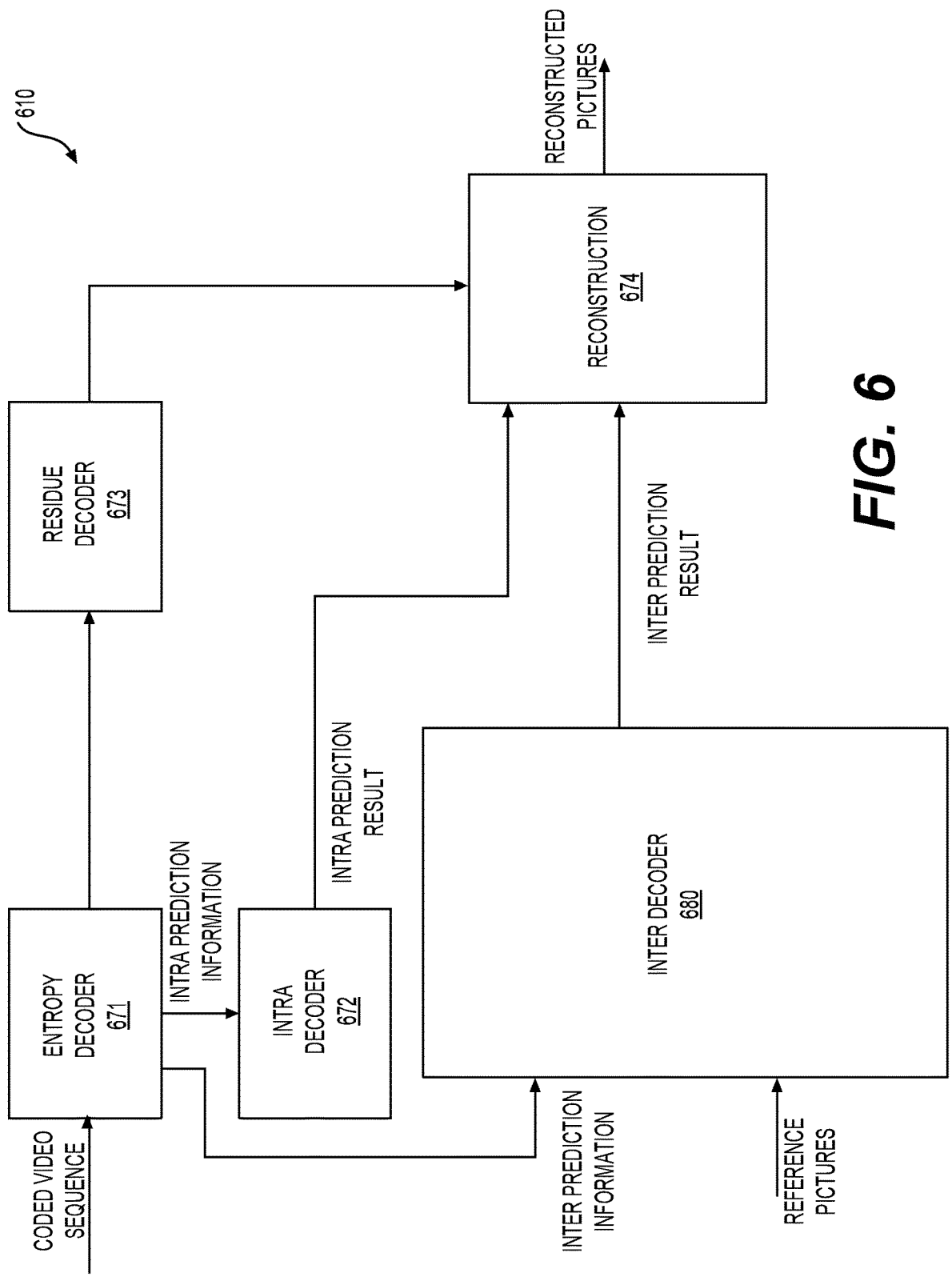
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Aspects of the disclosure provide techniques for use in lossless coding mode.

Generally, a block partitioning structure is used during encoding/decoding. In some examples, the block partitioning structure is referred to as a coding tree. In an example (e.g., HEVC), the coding tree can have a quad tree structure with each split splitting a larger square block into four smaller square blocks. In some examples, according to the quad tree structure, a coding tree unit (CTU) is split into coding units (CUs) to adapt to various local characteristics. A decision on whether to code a picture area using an inter-picture (temporal) or intra-picture (spatial) prediction is made at CU level. Each CU can be further split into one, two, or four prediction units (PUs) according to a PU splitting type. Inside one PU, a same prediction process is applied and relevant information is transmitted to a decoder on a PU basis.

After obtaining a residual block by applying a prediction process based on the PU splitting type, a CU can be partitioned into transform units (TUs) according to another quad tree structure. In the example of HEVC, there are multiple partition conceptions including CU, PU, and TU. In some embodiments, a CU or a TU can only be square shape, while a PU may be square or rectangular shape. In some embodiments, one coding block may be further split into four square sub-blocks, and transform is performed on each sub-block, i.e., TU. Each TU can be further split recursively into smaller TUs using a quad tree structure which is called residual quad tree (RQT).

At a picture boundary, in some embodiments, implicit quad tree split can be employed so that a block will keep quad tree splitting until the size fits the picture boundary.

In some examples, a block partitioning structure can use quad tree plus binary tree (QTBT) block partitioning structure. The QTBT structure can remove the concepts of multiple partition types (the CU, PU and TU concepts), and supports more flexibility for CU partition shapes. In the QTBT block partitioning structure, a CU can have either a square or rectangular shape.

Figure 7B:
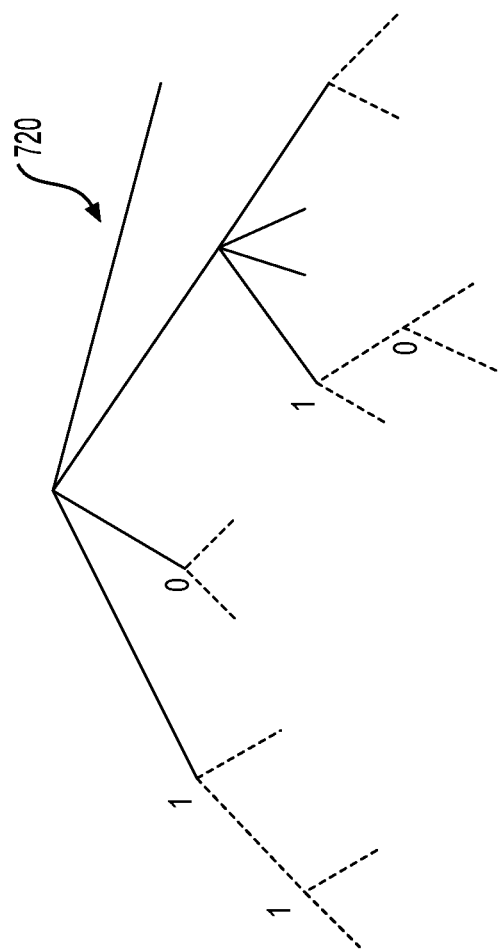
FIGS. 7A and 7B show a CTU that is partitioned by using a block partitioning structure.
Figure 7A:
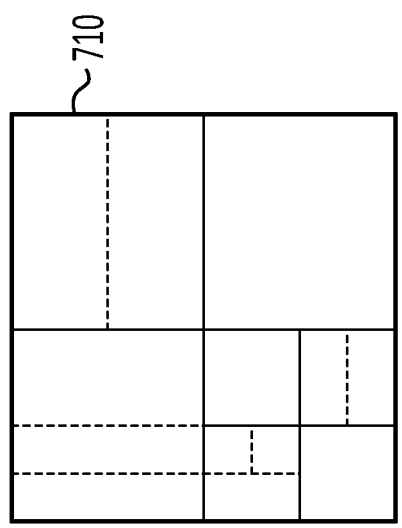

FIG. 7A shows a CTU (710) that is partitioned by using a QTBT block partitioning structure (720) shown in FIG. 7B. The CTU (710) is first partitioned by a quad tree structure. The quad tree leaf nodes are further partitioned by a binary tree structure or a quad tree structure. There can be two splitting types, symmetric horizontal splitting (e.g., labeled as "0" in the QTBT block partitioning structure (720)) and symmetric vertical splitting (e.g., labeled as "1" in the QTBT block partitioning structure (720)), in the binary tree splitting. The leaf nodes without further splitting are called CUs that can be used for prediction and transform processing without any further partitioning. Accordingly, CU, PU and TU have the same block size in the QTBT block partitioning structure.

In some embodiments, a CU can include coding blocks (CBs) of different color components. For example, one CU contains one luma CB and two chroma CBs in the case of P and B slices of the 4:2:0 chroma format. A CU can include a CB of a single color component. For example, one CU contains only one luma CB or just two chroma CBs in the case of I slices.

The following parameters are defined for the QTBT block partitioning scheme in some embodiments:
CTU size: the root node size of a quad tree, e.g. the same concept as in HEVC.
MinQTSize: the minimum allowed quad tree leaf node size.
MaxBTSize: the maximum allowed binary tree root node size.
MaxBTDepth: the maximum allowed binary tree depth.
MinBTSize: the minimum allowed binary tree leaf node size.

In one example of the QTBT block partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quad tree partitioning is applied to the CTU first to generate quad tree leaf nodes. The quad tree leaf nodes may have a size from 16×16 (i.e., the MinQTSize) to 128×128 (i.e., the CTU size). If the leaf quad tree node is 128×128, it will not be further split by the binary tree since the size exceeds the MaxBTSize (i.e., 64×64). Otherwise, the leaf quad tree node could be further partitioned by the binary tree. Therefore, the quad tree leaf node is also the root node for the binary tree and it has the binary tree depth as 0.

When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In an embodiment, a maximum CTU size is 256×256 luma samples.

In FIGS. 7A and 7B, the solid lines indicate quad tree splitting and dotted lines indicate binary tree splitting. In each splitting (i.e., non-leaf) node of the binary tree, one flag is signaled to indicate which splitting type (i.e., horizontal or vertical) is used. For example, 0 indicates a horizontal splitting and 1 indicates a vertical splitting. For the quad tree splitting, there is no need to indicate the splitting type since quad tree splitting can split a block both horizontally and vertically to produce 4 sub-blocks with an equal size.

In some embodiments, the QTBT block partitioning scheme supports the flexibility for the luma and chroma to have a separate QTBT block partitioning structure. For example, for P and B slices, the luma and chroma blocks in one CTU share the same QTBT block partitioning structure. However, for I slices, the luma CTB is partitioned into CUs by a QTBT block partitioning structure, and the chroma blocks are partitioned into chroma CUs by another QTBT block partitioning structure. Thus, a CU in an I slice consists of a coding block of the luma component or coding blocks of two chroma components, and a CU in a P or B slice consists of coding blocks of all three color components.

In some embodiments, inter prediction for small blocks is restricted to reduce memory access of motion compensation. For example, bi-prediction is not supported for 4×8 and 8×4 blocks, and inter prediction is not supported for 4×4 blocks.

Further, in some examples, a multi-type tree (MTT) block partitioning structure is used. The MTT block partitioning structure is a more flexible tree structure than the QTBT block partitioning structure. In MTT, in addition to quad tree partitioning and binary tree partitioning, horizontal center-side triple tree partitioning and vertical center-side triple tree partitioning can be used.

Figure 8B:
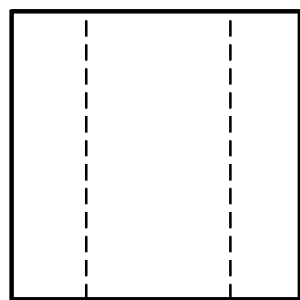
FIGS. 8A and 8B show examples of triple tree partitioning.
Figure 8A:
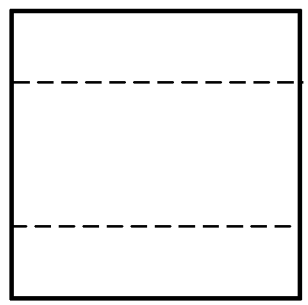

FIG. 8A shows an example of vertical center-side triple tree partitioning and FIG. 8B shows an example of horizontal center-side triple tree partitioning. Triple tree partitioning can complement quad-tree and binary-tree partitioning. For example, triple-tree partitioning is able to capture objects which locate in a block center, while quad-tree and binary-tree splits crossing block centers. The width and height of partitions by triple trees are a power of 2 so that no additional transform partition is needed.

According to some aspects of the disclosure, lossless coding mode is useful and is supported in video standard, such as HEVC and the like. In some application scenarios, such as medical imaging where loss of information may result in diagnostic errors, any degradation of video quality is not desired. Thus, a lossless coding approach can be enabled in the application scenarios.

In an embodiment, when a lossless coding mode is activated, transform and quantization can be bypassed, and one or more loop filter such as deblocking filter can also be disabled. In an example, a flag, denoted by transquant_bypass_enable_flag, can be signaled in a picture parameter set (PPS). If a decoder receives such a flag and its value is signaled as 1, the decoder may bypass transform, quantization and loop filter processing.

FIGS. 9A and 9B show a syntax table (900) in picture parameter set. In the syntax table (900), a flag that is denoted as transquant_bypass_enable_flag (shown by (910)) can be used to enable or disable lossless coding mode.

For example, when transquant_bypass_enable_flag is equal to 1, then a CU level bypass flag (indicating whether transform and quantization need to be bypass at the CU level), that is denoted as cu_transquant_bypass_flag, can be present. When transquant_bypass_enable_flag is equal to 0, then the CU level bypass flag cu_transquant_bypass_flag is not present. For each CU, if the transquant_bypass_enable_flag is true (e.g., "1"), the CU level bypass flag cu_transquant_bypass_flag can further be signaled for CUs to indicate whether transform, quantization and loop filter is disabled for current CU. In an example, when the cu_transquant_bypass_flag is signaled as true (e.g., "1"), a syntax element indicating transform skip mode (TSM) (transform_skip_flag) is not signaled, and a sign data hiding mode is disabled.

In an example, when the cu_transquant_bypass_flag is equal to 1, the scaling and transform process and the in-loop filter process are need to be bypassed. When the cu_transquant_bypass_flag is not present in an example, the cu_transquant_bypass_flag can be inferred to be equal to 0.

In some embodiments, a specific residual coding mode can take the advantage that Cb and Cr residuals appear to correlate inversely with each other. The specific residual coding mode enables jointly coding of chrominance residuals, and is referred to as joint chroma residual coding mode (also referred to as joint Cb Cr residual (JCCR) coding mode). In JCCR coding mode, there is a single residual indicated for two chrominance blocks of a transform unit. The indicated residual is added to the prediction block in the first channel (typically representing Cb) and deducted from the prediction block in the second channel (typically representing Cr).

In an example, a joint chroma residual mode is indicated with a flag in a bitstream if the coded block flags (cbf) for both Cb and Cr are true. If the JCCR coding mode is activated, a single residual block is decoded. The bitstream syntax and decoding process of joint residual blocks can be similar to that of regular Cb residuals in an example. The residuals of the Cr blocks are generated by negating the decoded joint residual. As a single residual is used to represent residuals of two blocks, it may often be desirable for this mode to use a QP lower than what is used for separate coding of chrominance residuals. In an example, a chroma QP offset of −1 was used for the joint mode and +1 was used for separate chroma coding.

For the JCCR coding mode, several syntax elements at different coding level, such as PPS level, tile level, block level and the like, are related to the JCCR coding mode.

Figure 10A:
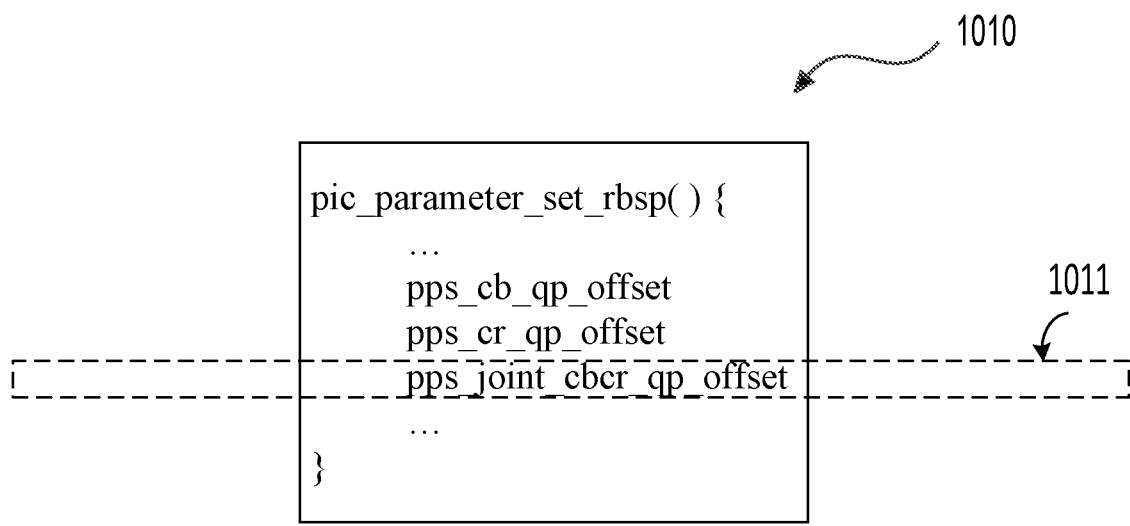
FIGS. 10A-10C show some syntax table examples.

FIG. 10A shows a syntax table (1010) for PPS raw byte sequence payload (RBSP) syntax. In FIG. 10A, a syntax element pps_joint_cbcr_qp_offset shown by (1011) specifies the offset to the luma quantization parameter $Qp'_Y$ used for deriving $Qp'_{CbCr}$. In an example, the value of pps_joint_cbcr_qp_offset can be in the range of −12 to +12, inclusive. When ChromaArrayType is equal to 0, pps_joint_cbcr_qp_offset is not used in the decoding process and decoders can ignore its value.

Figure 10B:
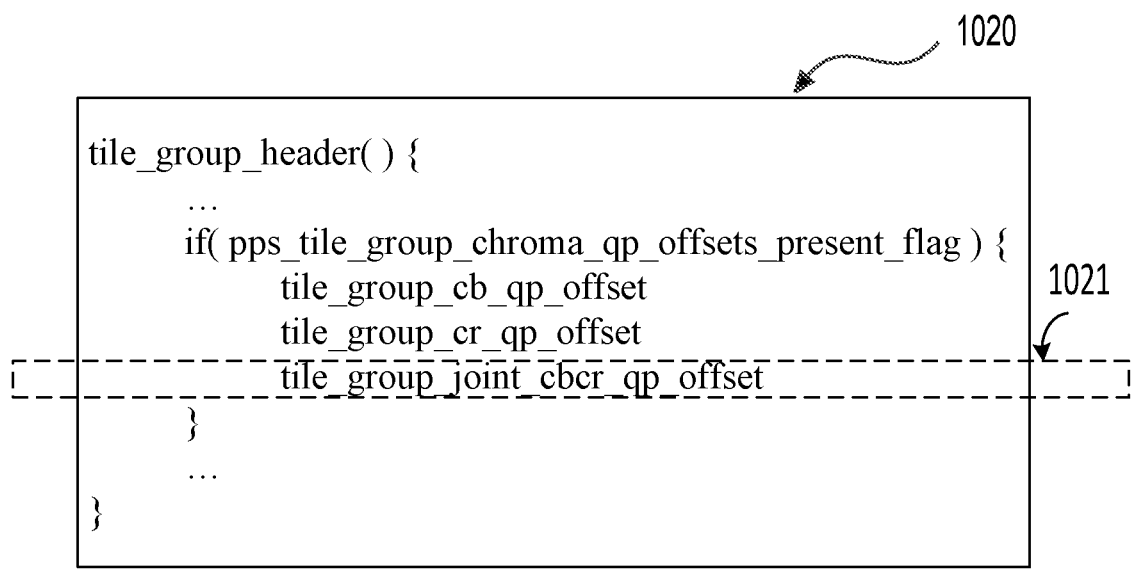

FIG. 10B shows a syntax table (1020) for general tile group header syntax. In FIG. 10B, a syntax element tile_group_joint_cbcr_qp_offset shown by (1021) specifies a difference to be added to the value of pps_joint_cbcr_qp_offset when determining the value of the $Qp'_{CbCr}$ quantization parameter. In an example, the value of tile_group_joint_cbcr_qp_offset can be in the range of −12 to +12, inclusive. When tile_group_joint_cbcr_qp_offset is not present, it is inferred to be equal to 0. The value of pps_joint_cbcr_qp_offset+tile_group_joint_cbcr_qp_offset shall be in the range of −12 to +12, inclusive.

Figure 10C:
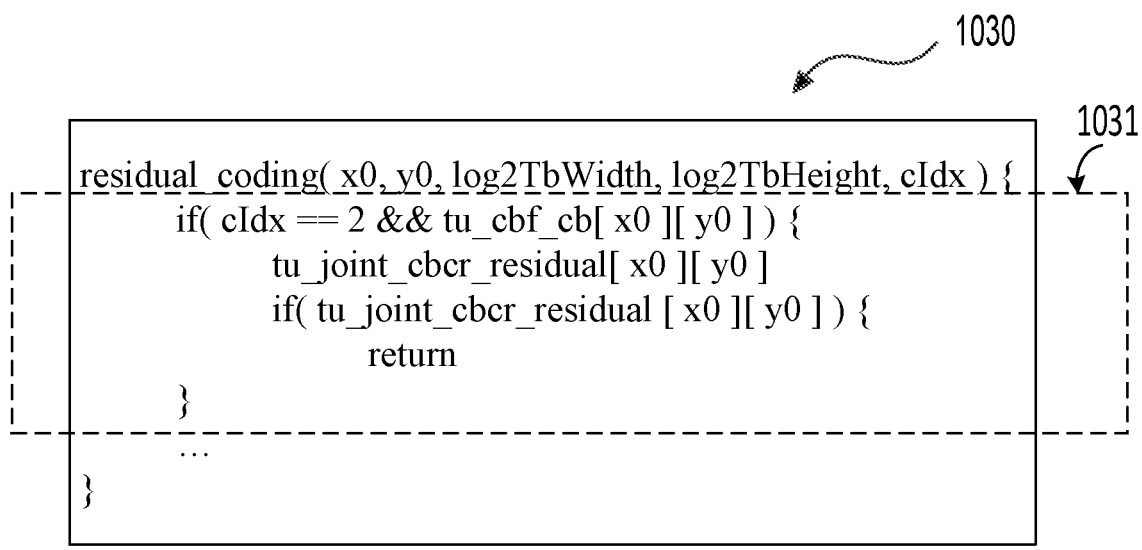

FIG. 10C shows a syntax table (1030) for residual coding syntax. In FIG. 10C, the syntax element tu_joint_cbcr_residual[x0][y0] as shown in (1031), specifies whether indicated Cb residual is used to derive both Cb and Cr residuals. The array indices x0, y0 specify the location (x0, y0) of the top-left luma sample of the considered transform block relative to the top-left luma sample of the picture. In an example, the tu_joint_cbcr_residual[x0][y0] equal to 1 specifies that the indicated Cb residual is used to derive the Cr residual. The tu_joint_cbcr_residual[x0][y0] equal to 0 specifies that Cr residual may be present in the bitstream depending on other syntax elements. When tu_joint_cbcr_residual[x0][y0] is not present, it is inferred to be equal to 0.

According to an aspect of the disclosure, joint chroma residual coding can include several processes, such as a derivation process for quantization parameters, a scaling and transformation process, a scaling process for transform coefficients, and the like.

In an example, the derivation process for quantization parameters can be performed as follows. The variables $qP_{Cb}$, $qP_{Cr}$ and $qP_{CbCr}$ can be derived as according to:

$qPi_{Cb}$=Clip3(−QpBdOffset$_C$, 69, Qp$_Y$+pps_cb_qp_offset+ tile_group_cb_qp_offset)

$qPi_{Cr}$=Clip3(−QpBdOffset$_C$, 69, Qp$_Y$+pps_cr_qp_offset+ tile_group_cr_qp_offset)

$qPi_{CbCr}$=Clip3(−QpBdOffset$_C$, 69, Qp$_Y$+pps_joint_cbcr_qp_offset+tile_group_joint_cbcr_qp_offset)

If ChromaArrayType is equal to 1, the variables $qP_{Cb}$, $qP_{Cr}$ and $qP_{CbCr}$ are set equal to the value of $Qp_C$ based on the index qPi equal to $qPi_{Cb}$, $qPi_{Cr}$ and $qP_{CbCr}$, respectively. Otherwise, the variables $qP_{Cb}$, $qP_{Cr}$ and $qP_{CbCr}$ are set equal to Min(qPi, 63), based on the index qPi equal to $qPi_{Cb}$, $qPi_{Cr}$ and $qP_{CbCr}$, respectively. The chroma quantization parameters for the Cb and Cr components, Qp'Cb and Qp'Cr, and joint Cb-Cr coding $Qp'_{CbCr}$, are derived as follows:

$Qp'_{Cb}$=$qP_{Cb}$+QpBdOffset$_C$ $QP'_{Cr}$=$qP_{Cr}$+QpBdOffset$_C$ $QP'_{CbCr}$=$qP_{CbCr}$+QpBdOffset$_C$ In an example, the scaling and transformation process can be performed as follows. The (nTbW)×(nTbH) array of residual samples resSamples can be derived. For example, if cIdx is equal to 2 and tu_joint_cbcr_residual[xTbY][yTbY] is equal to 1, the residual samples resSamples[x][y] with x=0 . . . nTbW−1, y=0 . . . nTbH−1 are derived as follows:

resSamples[x][y]=−resSamplesCb[x][y]

where resSamplesCb[x][y] is the residual sample array generated for a chrominance block with the transform block location (xTbY, yTbY) and cIdx equal to 1.

In an example, the scaling process for transform coefficients can be performed as follows. The quantization parameter qP is derived as follows. If cIdx is equal to 0, the following applies:

qP=Qp'$_Y$

Otherwise, if cIdx is equal to 1 and tu_joint_cbcr_residual [xTbY][yTbY] is equal to 1, the following applies:

qP=Qp'$_{CbCr}$

According to some aspects of the disclosure, a coding tool that is referred to as luma mapping with chroma scaling (LMCS) is used.

In some embodiments, a coding tool LMCS is added as a processing block before loop filters. LMCS can have two main components: 1) in-loop mapping of the luma component based on adaptive piecewise linear models; 2) for the chroma components, luma-dependent chroma residual scaling is applied.

Figure 11:
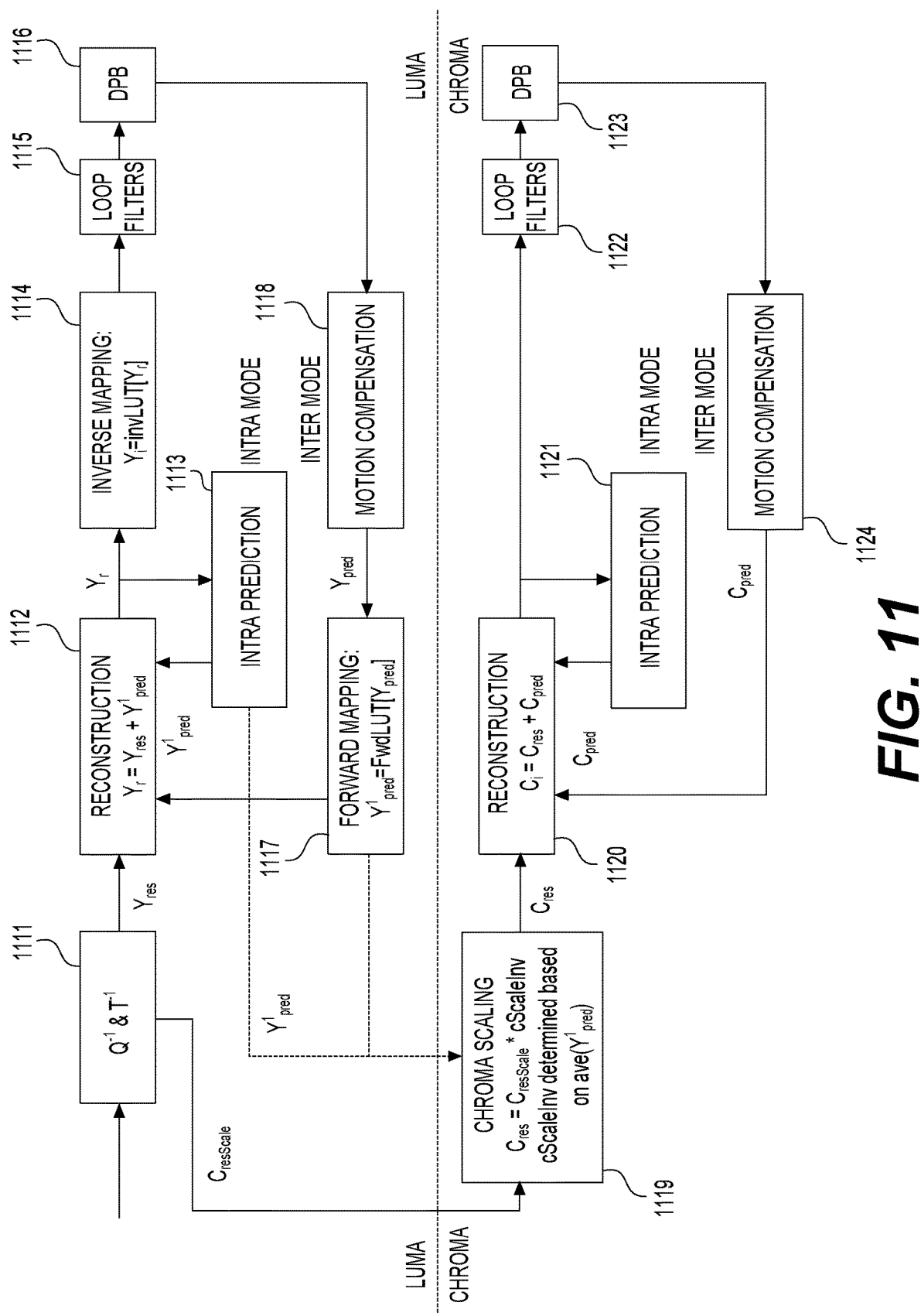
FIG. 11 shows a luma mapping with chroma scaling (LMCS) architecture from decoder's perspective.

FIG. 11 shows an LMCS architecture from decoder's perspective. The blocks (1111, 1112, 1113) in FIG. 11 indicate where the processing is applied in the mapped domain. The processing includes the inverse quantization and inverse transform (1111), luma intra prediction (1113) and adding of the luma prediction together with the luma residual (1112). The blocks (1115, 1116, 1118, 1120-1124) in FIG. 11 indicate where the processing is applied in the original (i.e., non-mapped) domain. The processing includes loop filters (1115, or 1122) such as deblocking, adaptive loop filter (ALF), and sample adaptive offset (SAO), motion compensated prediction (1118 or 1124), chroma intra prediction (1121), adding of the chroma prediction together with the chroma residual (1120), and storage of decoded pictures as reference pictures in decoded picture buffers (DPBs) (1116 or 1123). The blocks (1114, 1117, and 1119) in FIG. 11 are the LMCS functional blocks, including forward and inverse mapping of the luma signal (1114 and 1117) and a luma-dependent chroma scaling process (1119). In an example, LMCS can be enabled/disabled at the sequence level using a sequence parameter set (SPS) flag.

In some embodiments, luma mapping is performed with piecewise linear model. In some examples, the in-loop mapping of the luma component adjusts the dynamic range of the input signal by redistributing the codewords across the dynamic range to improve compression efficiency. Luma mapping makes use of a forward mapping function, FwdMap, and a corresponding inverse mapping function, InvMap. The FwdMap function is signaled using a piecewise linear model with 16 equal pieces. InvMap function does not need to be signaled and is instead derived from the FwdMap function.

In some examples, the luma mapping model is signaled at the tile group level. A presence flag is signaled first. If luma mapping model is present in the current tile group, corresponding piecewise linear model parameters are signaled. The piecewise linear model partitions the input signal's dynamic range into 16 equal pieces, and for each piece, linear mapping parameters of the piecewise linear model are expressed using the number of codewords assigned to that piece. Take 10-bit input as an example. Each of the 16 pieces will have 64 codewords assigned to it by default. The signaled number of codewords is used to calculate the scaling factor and adjust the mapping function accordingly for that piece. At the tile group level, another LMCS enable flag is signaled to indicate if the LMCS process as depicted in FIG. 11 is applied to the current tile group.

Each i-th piece, i=0 . . . 15, of the FwdMap piecewise linear model is defined by two input pivot points InputPivot[ ] and two output (mapped) pivot points MappedPivot[ ].

The InputPivot[ ] and MappedPivot[ ] are computed as follows (assuming 10-bit video):

(1) OrgCW=64

(2) For i=0:16, InputPivot[i]=i*OrgCW (3) For i=0:16, MappedPivot[i] is calculated as follows:
  MappedPivot[0]=0;
  for(i=0; i<16; i++)
    MappedPivot[i+1]=MappedPivot[i]+SignaledCW[i]

where SignaledCW[i] is the signaled number of codewords for the i-th piece.

As shown in FIG. 11, for an inter-coded block, motion compensated prediction is performed in the mapped domain. In other words, after the motion-compensated prediction block $Y_{pred}$ is calculated based on the reference signals in the DPB, the FwdMap function is applied to map the luma prediction block in the original domain to the mapped domain, $Y'_{pred}$=FwdMap($Y_{pred}$). For an intra-coded block, the FwdMap function is not applied because intra prediction is performed in the mapped domain. After reconstructed block $Y_r$ is calculated, the InvMap function is applied to convert the reconstructed luma values in the mapped domain back to the reconstructed luma values in the original domain ($\hat{Y}_i$=InvMap($Y_r$)). The InvMap function is applied to both intra- and inter-coded luma blocks.

The luma mapping process (forward and/or inverse mapping) can be implemented using either look-up-tables (LUT) or using on-the-fly computation. If LUT is used, then FwdMapLUT and InvMapLUT can be pre-calculated and pre-stored for use at the tile group level, and forward and inverse mapping can be simply implemented as FwdMap ($Y_{pred}$) FwdMapLUT [$Y_{pred}$] and InvMap($Y_r$)=InvMapLUT [$Y_r$], respectively. Alternatively, on-the-fly computation may be used. Take forward mapping function FwdMap as an example. In order to figure out the piece to which a luma sample belongs, the sample value is right shifted by 6 bits (which corresponds to 16 equal pieces). Then, the linear model parameters for that piece are retrieved and applied on-the-fly to compute the mapped luma value. Let i be the piece index, a1, a2 be InputPivot[i] and InputPivot[i+1], respectively, and b1, b2 be MappedPivot[i] and MappedPivot[i+1], respectively. The FwdMap function is evaluated as follows:

$$FwdMap(Y_{pred})=((b2-b1)/(a2-a1))*(Y_{pred}-a1)+b1$$

The InvMap function can be computed on-the-fly in a similar manner, except that conditional checks need to be applied instead of a simple right bit-shift when figuring out the piece to which the sample value belongs, because the pieces in the mapped domain are not equal sized.

In some embodiments, luma-dependent chroma residual scaling can be performed. Chroma residual scaling is designed to compensate for the interaction between the luma signal and its corresponding chroma signals. Whether chroma residual scaling is enabled or not is also signaled at the tile group level. If luma mapping is enabled and if dual tree partition (also known as separate chroma tree) is not applied to the current tile group, an additional flag is signaled to indicate if luma-dependent chroma residual scaling is enabled or not. When luma mapping is not used, or when dual tree partition is used in the current tile group, luma-dependent chroma residual scaling is disabled. Further, luma-dependent chroma residual scaling can be disabled for the chroma blocks whose area is less than or equal to 4.

Chroma residual scaling depends on the average value of the corresponding luma prediction block (for both intra- and inter-coded blocks). Denote avgY' as the average of the luma prediction block. The value of $C_{ScaleInv}$ is computed in the following steps:

(1) Find the index $Y_{Idx}$ of the piecewise linear model to which avgY' belongs based on the InvMap function.

(2) $C_{ScaleInv}$=cScaleInv[$Y_{Idx}$], where cScaleInv[ ] is a pre-computed 16-piece LUT.

If the current block is coded as intra, combined inter and intra prediction (CIIP), or intra block copy (IBC, a.k.a. current picture referencing or CPR) modes, avgY' is computed as the average of the intra-, CIIP-, or IBC-predicted luma values; otherwise, avgY' is computed as the average of the forward mapped inter predicted luma values (Y'$_{pred}$ in FIG. 10). Unlike luma mapping, which is performed on the sample basis, $C_{ScaleInv}$ is a constant value for the chroma block. With $C_{ScaleInv}$ chroma residual scaling is applied as follows:

Encoder side: $C_{ResScale}=C_{Res}*C_{Scale}=C_{Res}/C_{ScaleInv}$
Decoder side: $C_{Res}=C_{ResScale}/C_{Scale}=C_{ResScale}*C_{ScaleInv}$ According to some aspects of the disclosure, block-based delta pulse code modulation (BDPCM) can be used, and further residual in BDPCM mode can be quantized.

In some embodiments, BDPCM is employed that uses reconstructed samples to predict the rows or columns line by line. For example, the signaled BDPCM direction indicates whether vertical or horizontal prediction is used. The reference pixels used are unfiltered samples. The prediction error is quantized in the spatial domain. Pixels are reconstructed by adding the dequantized prediction error to the prediction.

As an alternative scheme to BDPCM, quantized residual domain BDPCM is used in some embodiments. The signaling and prediction directions used can be identical to BDPCM scheme. The intra prediction is done on the block by sample copying in prediction direction (horizontal or vertical prediction) similar to intra prediction. The residual is quantized and the delta between the quantized residual and its predictor (horizontal or vertical) quantized value is coded. This can be described as follows.

For a block of size M (rows)×N (cols), let $r_{i,j}$, $0 \le i \le M-1$, $0 \le j \le N-1$ be the prediction residual after performing intra prediction horizontally (copying left neighbor pixel value across the the predicted block line by line) or vertically (copying top neighbor line to each line in the predicted block) using unfiltered samples from above or left block boundary samples. Let $Q(r_{i,j})$, $0 \le i \le M-1$, $0 \le j \le N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$.

When vertical BDPCM is signaled:

$$\tilde{r}_{i,j} = \begin{cases} Q(r_{i,j}), & i=0, 0 \le j \le (N-1) \\ Q(r_{i,j})-Q(r_{(i-1),j}), & 1 \le i \le (M-1), 0 \le j \le (N-1) \end{cases}.$$

For horizontal prediction, similar rules apply, and the residual quantized samples are obtained by $$\tilde{r}_{i,j} = \begin{cases} Q(r_{i,j}), & 0 \le i \le (M-1), j=0 \\ Q(r_{i,j})-Q(r_{i,(j-1)}), & 0 \le i \le (M-1), 1 \le j \le (N-1) \end{cases}.$$

The residual quantized samples $\tilde{r}_{i,j}$ are sent to the decoder.

On the decoder side, the above calculations are reversed to produce $Q(r_{i,j})$, $0 \le i \le M-1$, $0 \le j \le N-1$. For vertical prediction case, $Q(r_{i,j})=\Sigma_{k=0}^{i}\tilde{r}_{k,j}$, $0 \le i \le (M-1)$, $0 \le j \le (N-1)$.

For horizontal case, $Q(r_{i,j})=\Sigma_{k=0}^{j}\tilde{r}_{i,k}$, $0 \le i \le (M-1)$, $0 \le j \le (N-1)$.

The inverse quantized residuals, $Q^{-1}(Q(r_{i,j}))$, are added to the intra block prediction values to produce the reconstructed sample values.

In some examples (e.g., in VVC), for large transform block that has at least one side larger than a threshold (e.g., 32), a portion of the coefficients is coded. For example, a transform block has a size of 64×N (N is a positive integer), only the coefficients of the top-left 32×min(N,32) region can be coded. In another example, a transform block has a size of N×64 (N is a positive integer), only the coefficients of the top-left min(N,32)×32 region can be coded. In the above two examples, the remaining higher frequency coefficients are not coded and considered as 0. Then, the coefficient coding for larger transform block is not lossless.

Some aspects of the disclosure provide techniques for mathematically lossless representation of the video signal for the video coding. In some examples, coding tools which may create differences between input and reconstructed video signal, such as multiple transform selection (MTS), secondary transform, chroma residual entropy coding, in-loop reshaper (or namely Luma mapping with chroma scaling, LMCS), quantized-domain RDPCM and dependent quantization, and the like may be restricted for using in lossless coding mode.

In some examples, due to zero-out design, coefficient coding only supports N×32 and 32×N blocks, where N is an integer equal to or smaller than 32, and lossless mode for larger blocks, such as 64×M and M×64 blocks is undefined, where M is an integer equal to or smaller than 64. Thus, in some examples, some block partitioning techniques may depend on the lossless coding mode.

In the following, the term block may be interpreted as a prediction block, a coding block, or a coding unit, i.e. CU.

Further, when saying high-level syntax (HLS) element, it may refer to any of Video Parameter Set (VPS), Sequence Parameter Set (SPS), Picture Parameter Set (PPS), Slice header, Tile header, Tile group header. When saying CTU (coding tree unit, which is the largest CU size) header, it refers to syntax elements signaled for each CTU, e.g., as header information. In this document, when saying transform size, it may refer to the maximum transform width and/height, or maximum transform unit area size.

In some embodiments, a flag can be signaled at CU level to indicate whether a lossless coding mode is enabled for a respective coding block (or a respective coding unit).

Figure 12:
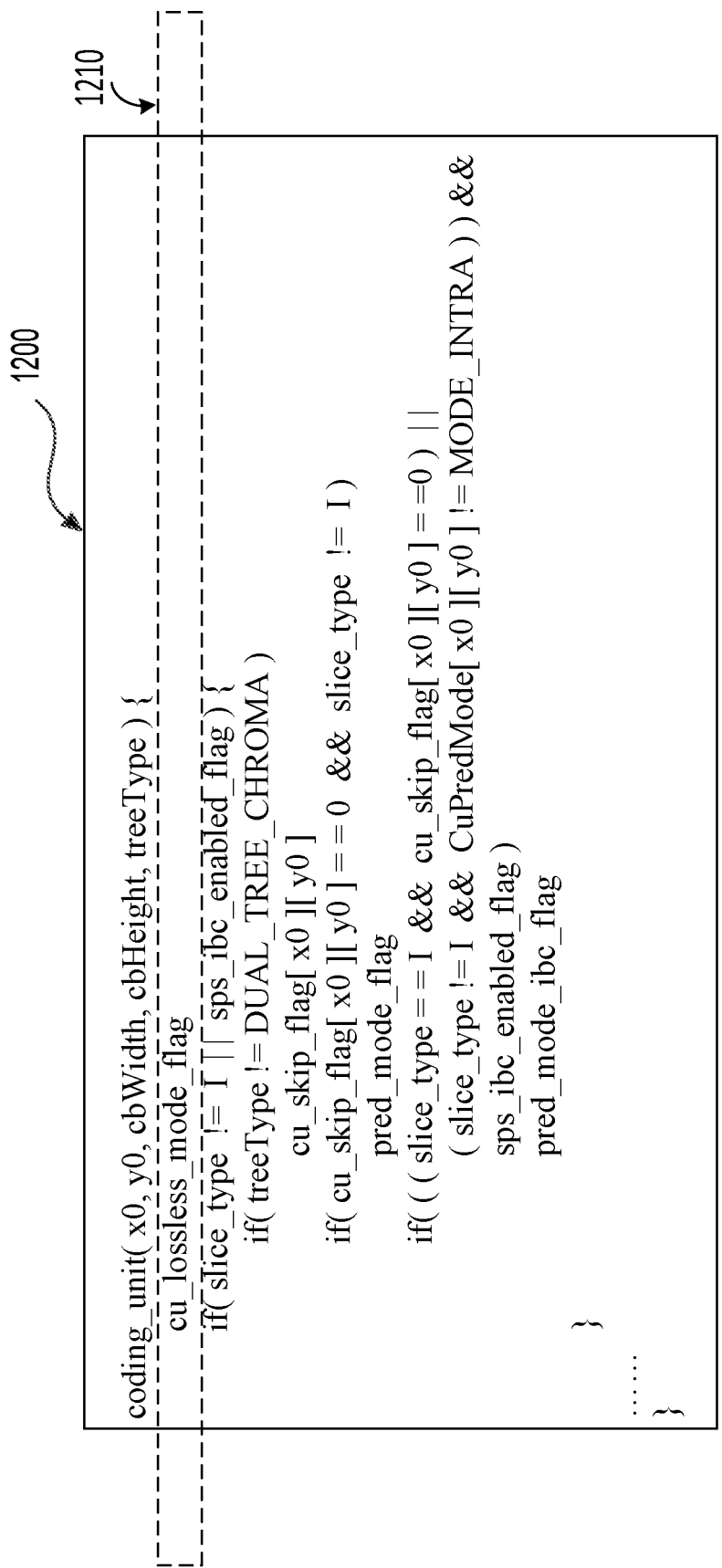
FIG. 12 shows a table of coding unit syntax in some embodiments.

FIG. 12 shows a table (1200) of coding unit syntax in some embodiments. The coding unit syntax includes a syntax element cu_lossless_mode_flag shown by (1210), that indicates whether a lossless coding mode is applied to the coding block (or coding unit). In an example, the cu_lossless_mode_flag equal to 1 can specify that the lossless coding mode is enabled for the coding unit, while the cu_lossless_mode_flag equal to 0 can specify that the lossless coding mode is disabled for the coding unit.

In some embodiments, a syntax element may be signaled to indicate whether a lossless mode can be allowed for current video data associated with the syntax element. For example, the current data can be a tile, a slice, a tile group, a picture, a sequence, entire video. Accordingly, the syntax element can be signaled at a tile header, a slice header, a time group header, a PPS, a SPS, a video parameter set (VPS), or the like. In one example, the syntax element indicating whether a lossless mode is enabled for current video data is denoted by lossless_mode_enable_flag. Semantics of the lossless_mode_enable_flag is as follows: lossless_mode_enable_flag equal to 1 specifies that cu_lossless_mode_flag is present. lossless_mode_enable_flag equal to 0 specifies that cu_lossless_mode_flag is not present.

Figure 13:
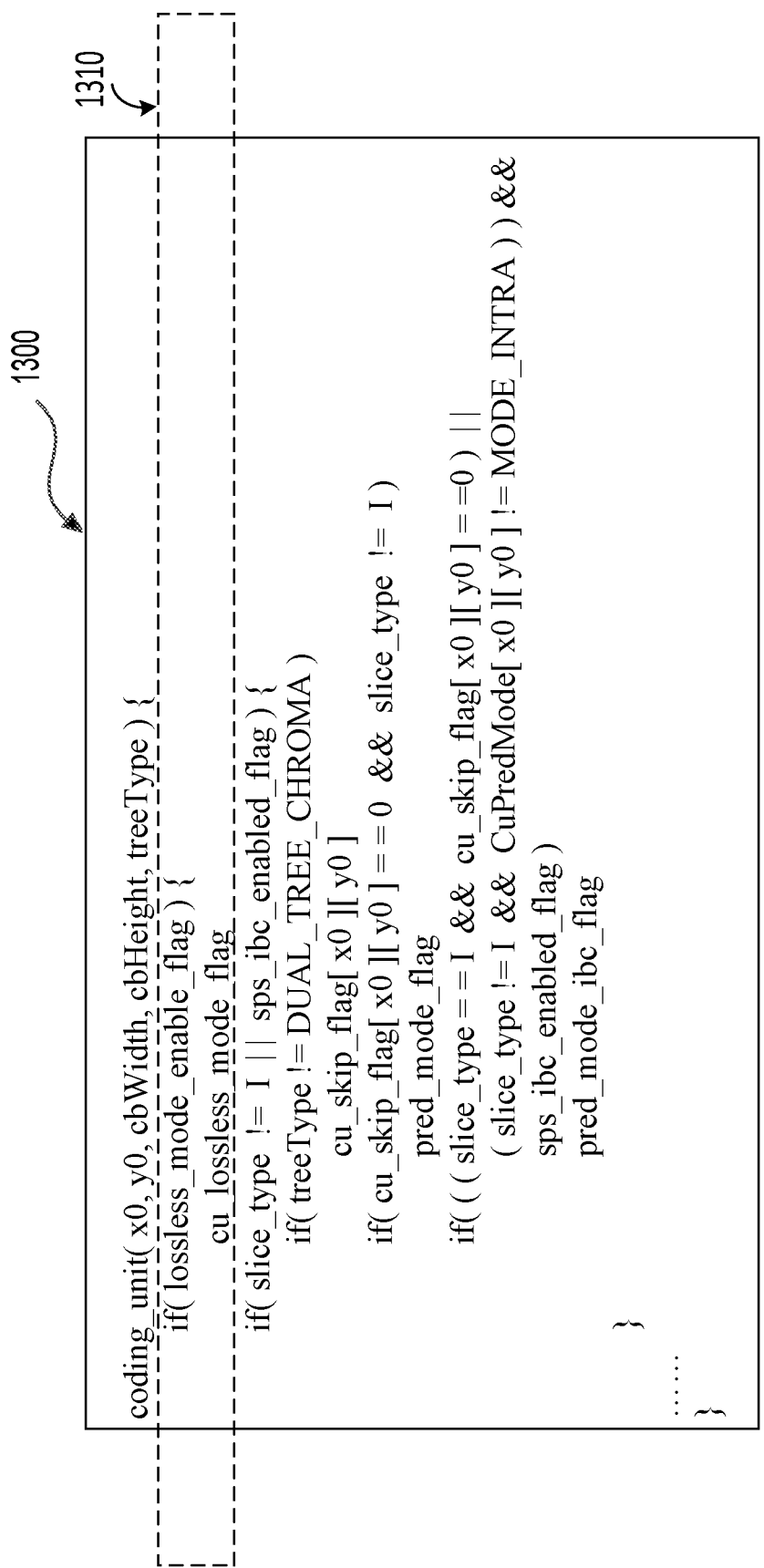
FIG. 13 shows another table of coding unit syntax in some embodiments.

FIG. 13 shows a table (1300) of coding unit syntax in some embodiments. As shown by (1310) in FIG. 13, the lossless_mode_enable_flag, which indicates whether a CU level lossless mode flag presents, is checked. When the lossless_mode_enable_flag is true (e.g., having a value of 1), then the CU level lossless mode flag cu_lossless_mode_flag is present for example in the coded bitstream (also referred to as signaled in some examples); otherwise, cu_lossless_mode_flag is not present in the coded bitstream for example.

In an embodiment, when a lossless coding mode flag cu_lossless_mode_flag is signaled with a value which indicates lossless coding mode is enabled for a current CU, then the joint chroma residual coding mode is not applied and a related indication flag tu_joint_cbcr_residual is not signaled. The tu_joint_cbcr_residual can indicate whether the joint chroma residual coding mode is enabled or not.

Figure 14:
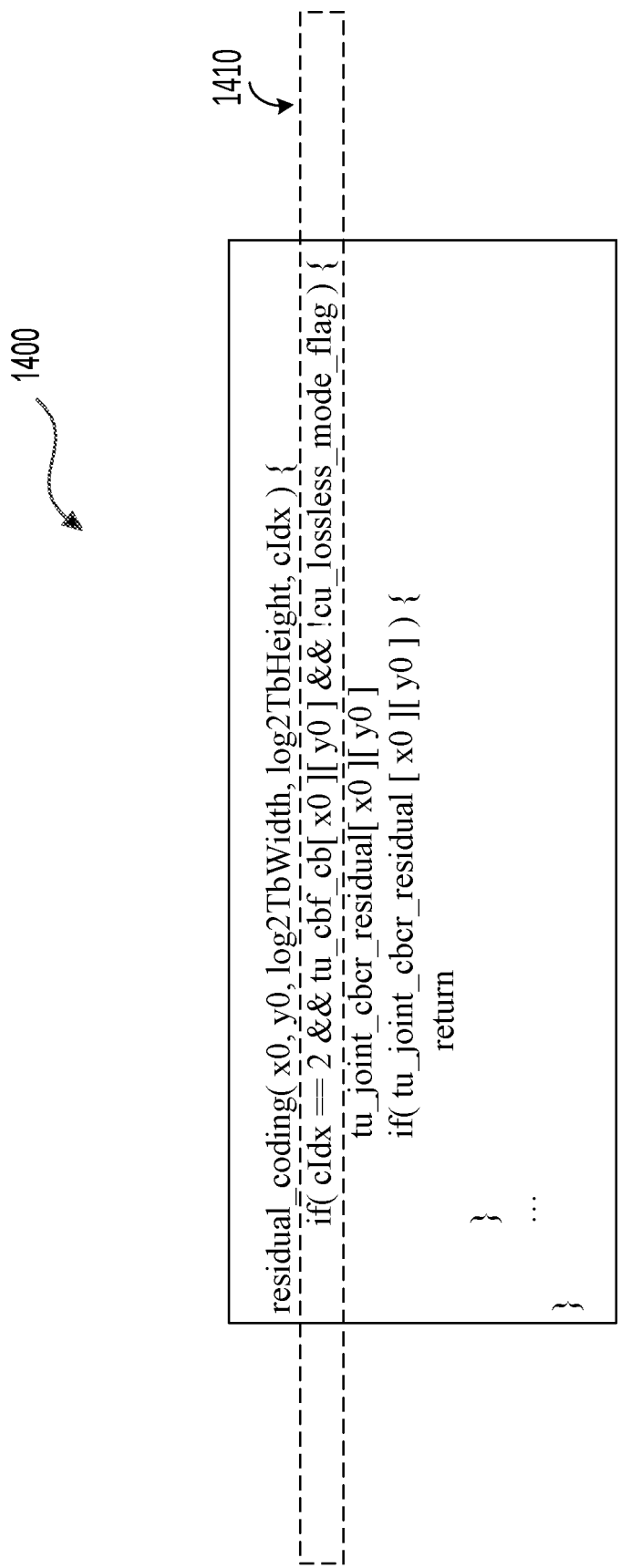
FIG. 14 shows an example of a table of residual coding syntax of a coding block.

FIG. 14 shows an example of a table (1400) of residual coding syntax of a coding block. As shown by (1410) in FIG. 14, the presence of an indication flag tu_joint_cbcr_residual is partially based on cu_lossless_mode_flag being false.

In an embodiment, when a lossless coding mode flag cu_lossless_mode_flag is signaled with a value which indicates lossless coding mode is enabled for a current CU, then LMCS is not applied no matter LMCS is enabled for the current slice (or picture, or video sequence) or not.

As an example, FIG. 15 shows a text (1500) of a specification of a video coding standard that is modified to accommodate implementation of a lossless coding mode. A reconstruction process of a coding block based on a slice_lmcs_enabled_flag is described in the text (1500). The slice_lmcs_enabled_flag can be signaled in a slice header, and indicate whether LMCS is enabled for a respective slice that includes the coding block. At a paragraph (1501), a condition (1502) of "cu_lossless_mode_flag is equal to 1" is added. According to the modified paragraph (1501), when the condition (1502) is true (a lossless mode is enabled), a first operation (1503) can be performed, which is equivalent to disabling the LMCS. When the condition (1502) is false, the first operation (1503) or a second operation (1504) can be performed depending on the value of slice_lmcs_enabled_flag.

FIG. 16 shows another text (1600) of a specification of a video coding standard that is modified to accommodate implementation of a lossless coding mode. A prediction process of CIIP mode for processing a coding block is described in the text (1600). The prediction process can depend on a slice_lmcs_enabled_flag. At a paragraph (1601), a condition (1602) of "cu_lossless_mode_flag is equal to 0" is added. According to the modified paragraph (1601), when the condition (1602) is false (a lossless mode is enabled), an operation (1603) can be skipped, which is equivalent to disabling the LMCS. When the condition (1602) is true, the operation (1603) can be performed depending on the value of slice_lmcs_enabled_flag.

In an embodiment, when a lossless coding mode flag cu_lossless_mode_flag is signaled with a value which indicates lossless coding mode is enabled for a current CU, then residual domain BDPCM is not applied or signaled.

FIG. 17 shows a table (1700) of coding unit syntax for coding a coding unit in some examples. As shown by (1710) in FIG. 17, a high level syntax lossless_mode_enable_flag is checked. When the lossless_mode_enable_flag is true, it can be determined a cu_lossless_mode_flag is signaled. Further, as shown by (1720) in FIG. 17, the cu_lossless_mode_flag is used for verification. When the cu_lossless_mode_flag is true, it can be determined that a bdpcm_flag is not signaled. Thus, the respective residual domain BDPCM can be disabled. The bdpcm_flag can be a syntax element indicating whether residual domain BDPCM coding mode is enabled for the current coding unit.

In an embodiment, when a lossless coding mode flag cu_lossless_mode_flag is signaled with a value which indicates lossless coding mode is enabled for current CU, some coding modes (e.g., MTS, transform skip (TS) mode, SBT, and secondary transform (ST)) are not applied or related syntax elements are not signaled.

FIGS. 18A-18B show a table (1800) of coding unit syntax for coding a coding unit. As shown by (1810), a presence of a flag for SBT is partially based on a cu_lossless_mode_flag. When the cu_lossless_mode_flag is true (indicating a lossless mode is enabled for the coding unit), an indication flag cu_sbt_flag is not signaled. The cu_sbt_flag can indicate if SBT is enabled for the coding unit. Accordingly, the SBT is not applied. Similarly, as shown by (1820), a presence of a flag for ST is partially based on the cu_lossless_mode_flag. When the cu_lossless_mode_flag is true, a syntax element, st_idx[x0][y0], is not signaled. The st_idx[x0][y0] is used to represent a secondary transform index and indicate if secondary transform (ST) mode is enabled for the coding unit. Accordingly, the ST mode is not applied when the cu_lossless_mode_flag is true.

FIGS. 19A-19B show a table (1900) of transform unit syntax in some examples. As shown by (1910), a presence of a flag for transform skip mode and a presence of a flag for MTS are partially based on the cu_lossless_mode_flag. When the cu_lossless_mode_flag is true (indicating a lossless mode is enabled for the coding unit), an indication flag transform_skip_flag[x0][y0], and a syntax element tu_mts_idx[x0][y0] are not signaled. The transform_skip_flag[x0][y0] can indicate if TS mode is enabled for the coding unit. The tu_mts_idx[x0][y0] can indicate an index of a selected transform if the MTS is enabled. Accordingly, the TS mode or the MTS is not applied when the cu_lossless_mode_flag is true.

In an embodiment, a high level syntax element, denoted by use_lossless_mode_flag, can be signaled in a SPS, a PPS, a VPS, a slice header, a tile header or a tile group header, to indicate whether only lossless coding modes are allowed for the current sequence, picture, video, slice, tile or tile group, respectively. When a lossless coding mode is used, lossy coding modes (or lossy coding tools) can be excluded for encoding and decoding.

In an embodiment, the lossless coding mode flag cu_lossless_mode_flag has slightly different indication from a flag cu_transquant_bypass_flag. For example, the flag cu_transquant_bypass_flag is used to indicate whether to bypass transform and quantization, and the lossless coding mode flag is used to indicate whether to bypass operations that may cause loss of video quality, such as transform, quantization, SAO, deblocking, ALF, joint chroma residual coding, LMCS, TSM and the like. Thus, the lossless coding mode flag cu_lossless_mode_flag can be signaled separately in addition to the flag cu_transquant_bypass_flag.

In another embodiment, CU level flags cu_lossless_mode_flag and cu_transquant_bypass_flag can be merged as one single flag (cu_transquant_bypass_flag or cu_lossless_mode_flag) which is not only indicating whether transform and quantization is bypassed, but also indicating whether several other coding tools, such as SAO, deblocking, ALF, joint chroma residual coding, LMCS, TSM, and the like are enabled or not.

In some embodiments, an HLS syntax element for lossless mode, such as denoted by use_lossless_mode_flag, is signaled in, for example, SPS, PPS, VPS, slice, tile or tile group, to indicate whether only lossless coding modes are allowed for the current sequence, picture, video, slice, tile or tile group, respectively.

In an embodiment, the HLS syntax element is used similarly as the CU level flags cu_lossless_mode_flag in the above description, but in a larger scope corresponding to the high level. For example, when the use_loseless_mode_flag is at a tile group level (or SPS, PPS, VPS, slice, tile and the like) and indicates that only lossless coding modes are allowed in the current tile group (or sequence, picture, video, slice, tile and the like), then, the lossless coding modes that which exclude several coding tools (e.g., joint chroma residual coding mode, LMCS, residual domain BDPCM coding mode, MTS, transform skip (TS) mode, SBT, secondary transform (ST), and the like) that may cause video quality loss can be used for encoding and decoding of the current tile group (or sequence, picture, video, slice, tile and the like).

According to some aspects of the disclosure, when the HLS syntax element for the lossless coding mode is indicative of only lossless coding modes are allowed, then certain size restrictions are applied during partition to limit block (e.g., coding block, transform block and the like) sizes, thus lossless coding modes can be applied to the blocks with no video quality loss.

In some embodiments, the lossless coding mode related HLS is signaled with a value indicating the bitstream is only lossless coded. Then, if the current CU height and/or width is greater than or equal to the transform size threshold (T) which always assume zero high-frequency coefficients, i.e., 64 in VVC draft 5, then the CU will be split further without signaling.

In an embodiment, for a W×H CU (W denotes width, and H denotes height), if the CU width W is greater than or equal to T, but the CU height H is less than T, then CU is split using binary tree split and is split vertically as two 0.5 W×H CUs.

In another embodiment, for a W×H CU, if the CU width W is less than T, but the CU height H is greater than or equal to T, then CU is split using binary tree split and is split horizontally as two W×0.5H CUs.

In another embodiment, for a W×H CU, if both the CU width W and CU height H are greater than or equal to T, then CU is split using quadtree split as four 0.5 W×0.5H CUs.

In some embodiments, a mixture of lossless and lossy coding modes is allowed for the current bitstream. Then, if the current CU height and/or width is greater than or equal to the transform size threshold (T) which always assume zero high-frequency coefficients, i.e., 64 in VVC draft 5, then only lossy mode can be used on the current CU. In an example, the flag indicating whether lossless mode is used is not signaled but is inferred as false, which means lossless mode is not used on the current CU.

In some embodiments, when the lossless coding mode related HLS syntax is signaled with a value indicating lossless coding mode can be can be used, then the CTU size is set as the maximum CU size which does not assume zero high-frequency coefficients, such as 32×32 in VVC draft 5. Thus, no CU will have size that may cause zero high-frequency coefficients.

In some embodiments, when the lossless coding mode related HLS is signaled with a value indicating that lossless coding mode can be used, if the current CU height and/or width is greater than or equal to the transform size threshold T which always assume zero high-frequency coefficients, i.e., 64 in VVC draft 5, then the TU of the current CU will be split further without signaling.

In an embodiment, for a CU, if the TU width (W) is greater than or equal to T, but the TU height (H) is not greater than or equal to T, then TU is split using binary tree split and is split vertically as two 0.5 W×H TUs.

In another embodiment, for a CU, if the TU width (W) is not greater than or equal to T, but the TU height (H) is greater than or equal to T, then TU is split using binary tree split and is split horizontally as two W×0.5H TUs.

In another embodiment, for a CU, if both the TU width (W) and CU height (H) are greater than or equal to T, then TU is split using quadtree split as four 0.5 W×0.5H TUs.

Figure 20:
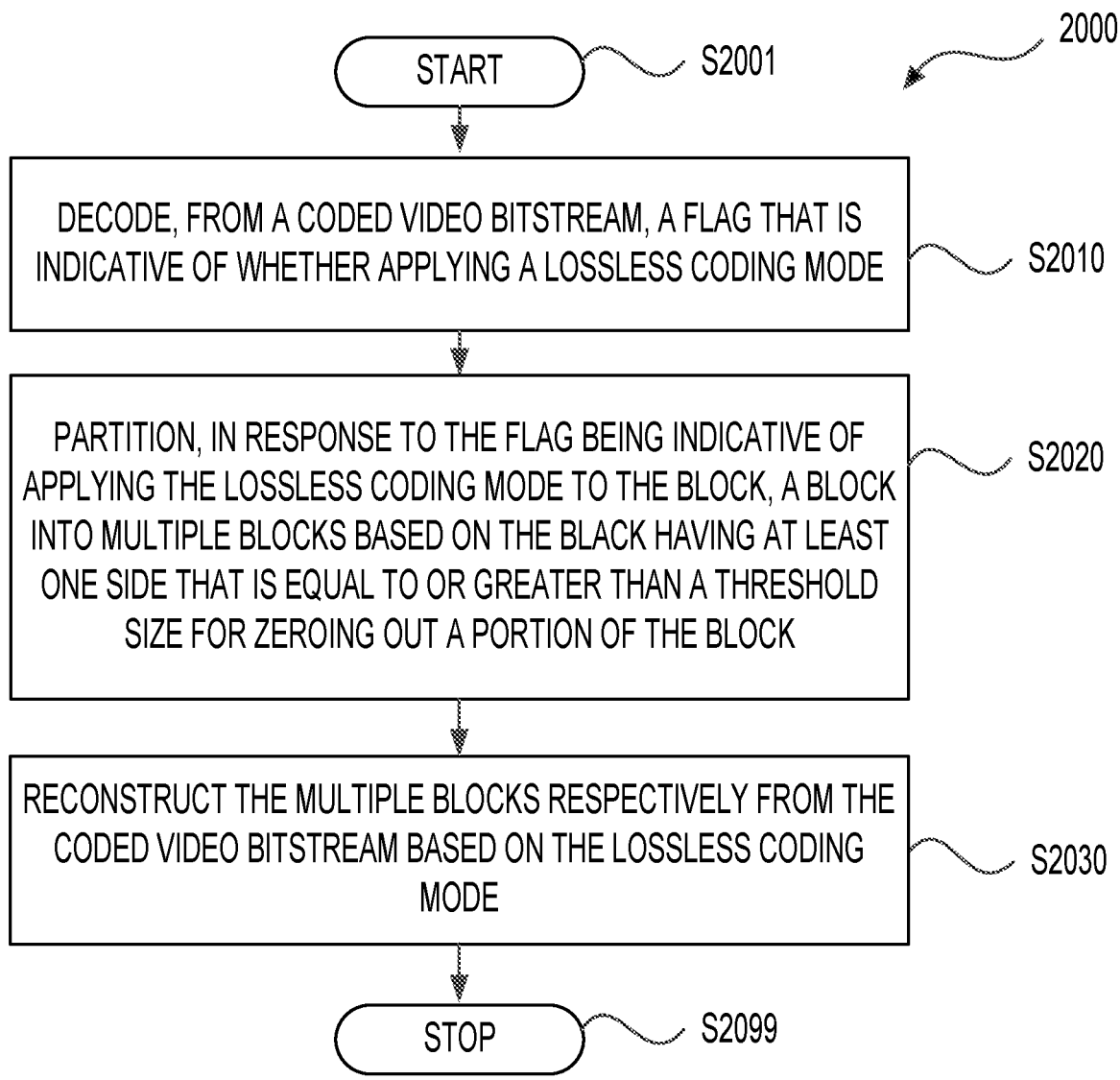
FIG. 20 shows a flow chart outlining a process example according to some embodiments of the disclosure.

FIG. 20 shows a flow chart outlining a process (2000) according to an embodiment of the disclosure. The process (2000) can be used in the reconstruction of a block, so to generate a prediction block for the block under reconstruction. In various embodiments, the process (2000) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (2000) is implemented in software instructions, thus when the processing circuitry executes the software instructions, the processing circuitry performs the process (2000). The process starts at (S2001) and proceeds to (S2010).

At (S2010), a flag is decoded from a coded video bitstream. The flag is used to indicate whether applying a lossless coding mode in the coded video bitstream, such as on a block in the coded video bitstream, in a tile, in a tile group, in a slice, in a picture, in a sequence of pictures, in a video, and the like.

At (S2020), when the flag is indicative of applying the lossless coding mode to a block, and the block has at least one side that is equal to or greater than a threshold size for zeroing out a portion of the block, the block is partitioned into multiple smaller blocks with sides being less than the threshold size. Thus, no portion of the block has been zeroed out, and video quality loss due to zero out can be avoided. The zero out operations can cause video quality loss and are avoided by splitting the block into multiple smaller blocks.

In an embodiment, the width of the block is equal to or greater than the threshold size and the height of the block is less than the threshold size splitting, then the block is split into a left block and a right block of equal sizes (e.g., two rectangular blocks).

In another embodiment, the width of the block is less than the threshold size and the height of the block is equal to or greater than the threshold size, then the block is split into a top block and a bottom block of equal sizes (e.g., two rectangular blocks).

In another embodiment, both of the width and the height of the block being equal to or greater than the threshold size, then the block is split into a top left block, a top right block, a bottom left block and a bottom right block of equal sizes (e.g., four rectangular blocks).

In some examples, the block can be a coding block. In some other examples, the block can be a transform block.

At (S2030), the multiple smaller blocks are reconstructed based on the lossless coding mode. Then the process proceeds to S2099 and terminates.

It is noted that, in some embodiments, a mixture of the lossless coding mode and lossy coding modes can be allowed in the coded video bitstream, and then the lossless coding mode can be disabled for applying on the block. Then, the block can be reconstructed based on a lossy coding mode.

It is also noted that, in some embodiment, a maximum coding tree unit (CTU) size can be set to be less than the threshold size to avoid the zero-out operation in coding tree units.

It is also noted that, in an embodiment, when the flag for the lossless coding mode is a CU level flag, the flag can be signaled separately from another flag that is used to indicate bypassing transform and quantization. In another embodiment, the flag for the lossless coding mode can be merged with the other flag for bypassing transform and quantization.

The techniques described above, can be implemented as computer software using computer-readable instructions and physically stored in one or more computer-readable media. For example, FIG. 21 shows a computer system (2100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 21:
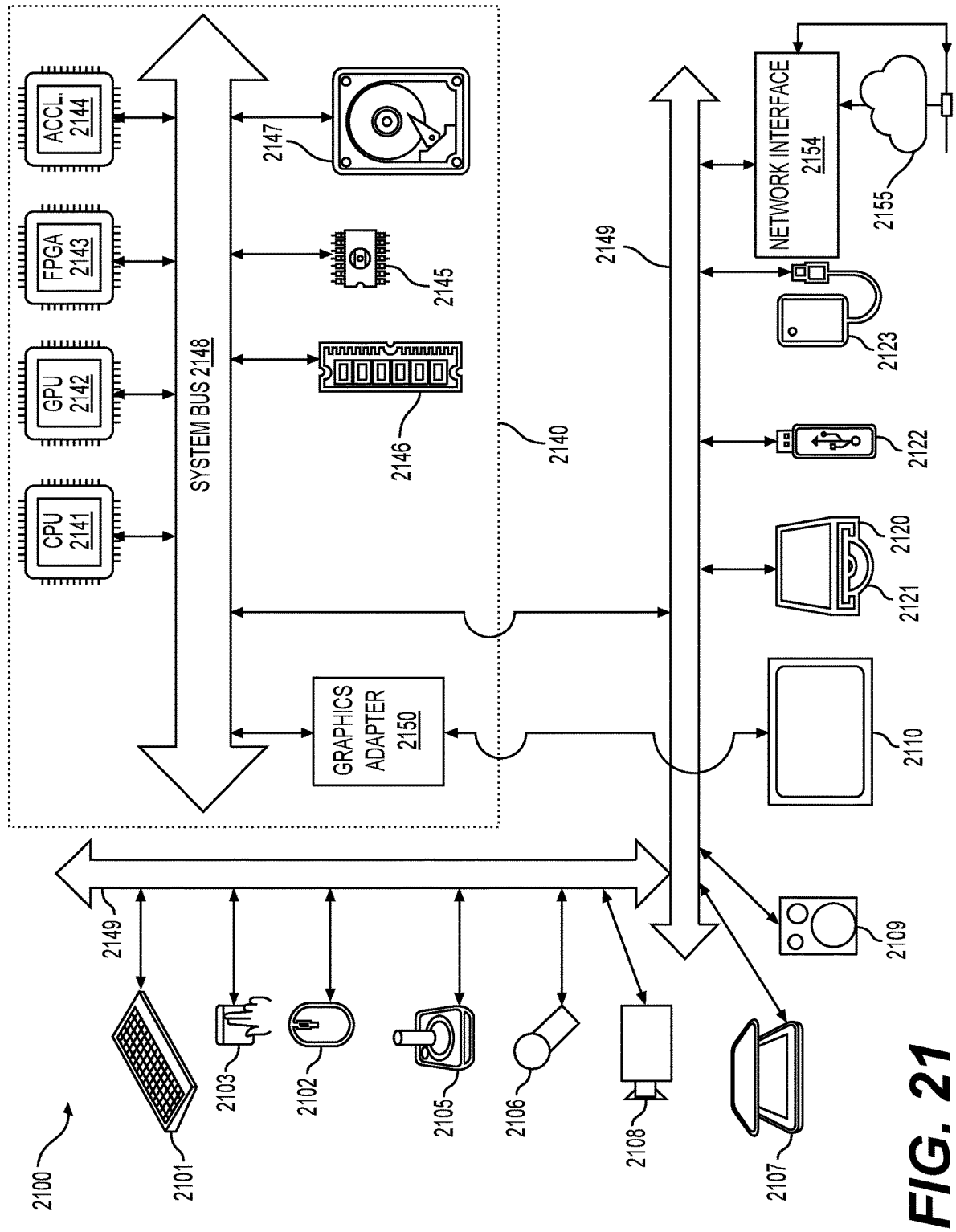
FIG. 21 is a schematic illustration of a computer system in accordance with an embodiment.

The components shown in FIG. 21 for computer system (2100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2100).

Computer system (2100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2101), mouse (2102), trackpad (2103), touch screen (2110), data-glove (not shown), joystick (2105), microphone (2106), scanner (2107), camera (2108).

Computer system (2100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2110), data-glove (not shown), or joystick (2105), but there can also be tactile feedback devices that do not serve as input devices), audio output devices (such as: speakers (2109), headphones (not depicted)), visual output devices (such as screens (2110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2100) can also include human accessible storage devices and their associated media such as optical media including CD/DVD ROM/RW (2120) with CD/DVD or the like media (2121), thumb-drive (2122), removable hard drive or solid state drive (2123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2100) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2149) (such as, for example USB ports of the computer system (2100)); others are commonly integrated into the core of the computer system (2100) by attachment to a system bus as described below (for example Ethernet interface into a PC computer system or cellular network interface into a smartphone computer system). Using any of these networks, computer system (2100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2140) of the computer system (2100).

The core (2140) can include one or more Central Processing Units (CPU) (2141), Graphics Processing Units (GPU) (2142), specialized programmable processing units in the form of Field Programmable Gate Areas (FPGA) (2143), hardware accelerators for certain tasks (2144), and so forth. These devices, along with Read-only memory (ROM) (2145), Random-access memory (2146), internal mass storage such as internal non-user accessible hard drives, SSDs, and the like (2147), may be connected through a system bus (2148). In some computer systems, the system bus (2148) can be accessible in the form of one or more physical plugs to enable extensions by additional CPUs, GPU, and the like. The peripheral devices can be attached either directly to the core's system bus (2148), or through a peripheral bus (2149). Architectures for a peripheral bus include PCI, USB, and the like.

CPUs (2141), GPUs (2142), FPGAs (2143), and accelerators (2144) can execute certain instructions that, in combination, can make up the aforementioned computer code. That computer code can be stored in ROM (2145) or RAM (2146). Transitional data can be also be stored in RAM (2146), whereas permanent data can be stored for example, in the internal mass storage (2147). Fast storage and retrieve to any of the memory devices can be enabled through the use of cache memory, that can be closely associated with one or more CPU (2141), GPU (2142), mass storage (2147), ROM (2145), RAM (2146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2100), and specifically the core (2140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2140) that are of non-transitory nature, such as core-internal mass storage (2147) or ROM (2145). The software implementing various embodiments of the present disclosure can be stored in such devices and executed by core (2140). A computer-readable medium can include one or more memory devices or chips, according to particular needs. The software can cause the core (2140) and specifically the processors therein (including CPU, GPU, FPGA, and the like) to execute particular processes or particular parts of particular processes described herein, including defining data structures stored in RAM (2146) and modifying such data structures according to the processes defined by the software. In addition or as an alternative, the computer system can provide functionality as a result of logic hardwired or otherwise embodied in a circuit (for example: accelerator (2144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
TSM: Transform Skip Mode
IBC: Intra Block Copy
DPCM: Differential pulse-code modulation
BDPCM: Block based DPCM While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
decoding, by a processor and from a coded video bitstream, a flag that indicates whether the coded video bitstream is only coded in a lossless coding mode;
determining, by the processor, whether a portion of a block is subject to a zero-out operation based on a comparison between a threshold number of samples and a number of samples in one of a height dimension and a width dimension of the block;
partitioning, by the processor, the block into multiple blocks in response to a determination that the portion of the block is subject to the zero-out operation when the flag indicates that the coded video bitstream is only coded in the lossless coding mode; and
reconstructing, by the processor, the multiple blocks respectively from the coded video bitstream based on the lossless coding mode.

2. The method of claim 1, wherein the flag is signaled in at least one of a video parameter set (VPS), a sequence parameter set (SPS), a picture parameter set (PPS), a slice header, a tile header, and a tile group header.

3. The method of claim 1, wherein the partitioning includes at least one of:
splitting, by the processor, the block into a left block and a right block of equal sizes based on the number of samples in the width dimension of the block being equal to or greater than the threshold number of samples and the number of samples in the height dimension of the block being less than the threshold number of samples;
splitting, by the processor, the block into a top block and a bottom block of equal sizes based on the number of samples in the width dimension of the block being less than the threshold number of samples and the number of samples in the height dimension of the block being equal to or greater than the threshold number of samples; and
splitting, by the processor, the block into a top left block, a top right block, a bottom left block, and a bottom right block of equal sizes based on the number of samples in both of the width dimension and the height dimension of the block being equal to or greater than the threshold number of samples.

4. The method of claim 1, wherein the block is at least one of a coding block and a transform block.

5. The method of claim 1, further comprising:
disabling, by the processor, the lossless coding mode for the block based on a mixture of the lossless coding mode and one or more lossy coding modes being allowed in the coded video bitstream; and
reconstructing, by the processor, the block from the coded video bitstream based on one of the one or more lossy coding modes.

6. The method of claim 1, further comprising:
setting, by the processor, a maximum coding tree unit (CTU) size to be less than the threshold number of samples to avoid the zero-out operation in coding tree units.

7. The method of claim 1, wherein the flag is a first flag associated with the block and indicates the block is only coded in the lossless coding mode, the first flag being different from a second flag for indicating a bypass of transform and quantization operations on the block.

8. The method of claim 1, wherein the flag is associated with the block and indicates the block is only coded in the lossless coding mode, which includes a bypass of transform and quantization operations on the block.

9. An apparatus for video decoding, comprising:
processing circuitry configured to:
decode, from a coded video bitstream, a flag that indicates whether the coded video bitstream is only coded in a lossless coding mode;
determine whether a portion of a block is subject to a zero-out operation based on a comparison between a threshold number of samples and a number of samples in one of a height dimension and a width dimension of the block;
partition the block into multiple blocks in response to a determination that the portion of the block is subject to the zero-out operation when the flag indicates that the coded video bitstream is only coded in the lossless coding mode; and
reconstruct the multiple blocks respectively from the coded video bitstream based on the lossless coding mode.

10. The apparatus of claim 9, wherein the flag is signaled in at least one of a video parameter set (VPS), a sequence parameter set (SPS), a picture parameter set (PPS), a slice header, a tile header, and a tile group header.

11. The apparatus of claim 9, wherein the block is partitioned by splitting into a left block and a right block of equal sizes based on the number of samples in the width dimension of the block being equal to or greater than the threshold number of samples and the number of samples in the height dimension of the block being less than the threshold number of samples.

12. The apparatus of claim 9, wherein the block is partitioned by splitting into a top block and a bottom block of equal sizes based on the number of samples in the width dimension of the block being less than the threshold number of samples and the number of samples in the height dimension of the block being equal to or greater than the threshold number of samples.

13. The apparatus of claim 9, wherein the block is partitioned by splitting into a top left block, a top right block, a bottom left block, and a bottom right block of equal sizes based on the number of samples in both of the width dimension and the height dimension of the block being equal to or greater than the threshold number of samples.

14. The apparatus of claim 9, wherein the block is at least one of a coding block and a transform block.

15. The apparatus of claim 9, wherein the processing circuitry is configured to:
disable the lossless coding mode for the block based on a mixture of the lossless coding mode and one or more lossy coding modes being allowed in the coded video bitstream; and
reconstruct the block from the coded video bitstream based on one of the one or more lossy coding modes.

16. The apparatus of claim 9, wherein the processing circuitry is configured to:
set a maximum coding tree unit (CTU) size to be less than the threshold number of samples to avoid the zero-out operation in coding tree units.

17. The apparatus of claim 9, wherein the flag is a first flag associated with the block and indicates the block is only coded in the lossless coding mode, the first flag being different from a second flag for indicating a bypass of transform and quantization operations on the block.

18. The apparatus of claim 9, wherein the flag is associated with the block and indicates the block is only coded in the lossless coding mode, which includes a bypass of transform and quantization operations on the block.

19. A non-transitory computer-readable medium storing instructions which, when executed by a computer, cause the computer to perform:

decoding, by a processor and from a coded video bitstream, a flag that indicates whether the coded video bitstream is only coded in a lossless coding mode;

determining, by the processor, whether a portion of a block is subject to a zero-out operation based on a comparison between a threshold number of samples and a number of samples in one of a height dimension and a width dimension of the block;

partitioning, by the processor, the block into multiple blocks in response to a determination that the portion of the block is subject to the zero-out operation when the flag indicates that the coded video bitstream is only coded in the lossless coding mode; and reconstructing, by the processor, the multiple blocks respectively from the coded video bitstream based on the lossless coding mode.

20. The non-transitory computer-readable medium of claim 19, wherein the partitioning includes at least one of:

splitting the block into a left block and a right block of equal sizes based on the number of samples in the width dimension of the block being equal to or greater than the threshold number of samples and the number of samples in the height dimension of the block being less than the threshold number of samples;

splitting the block into a top block and a bottom block of equal sizes based on the number of samples in the width dimension of the block being less than the threshold number of samples and the number of samples in the height dimension of the block being equal to or greater than the threshold number of samples; and splitting the block into a top left block, a top right block, a bottom left block, and a bottom right block of equal sizes based on the number of samples in both of the width dimension and the height dimension of the block being equal to or greater than the threshold number of samples.

\* \* \* \* \*